United States Patent
Haider et al.

(10) Patent No.: US 9,704,489 B2
(45) Date of Patent: Jul. 11, 2017

(54) PORTABLE ACOUSTICAL UNIT FOR VOICE RECOGNITION

(71) Applicant: AT&T Intellectual Property I, L.P., Atlanta, GA (US)

(72) Inventors: Nafiz Haider, Plano, TX (US); Kristin Patterson, Dallas, TX (US); Thomas Risley, Dallas, TX (US); Curtis Stephenson, McKinney, TX (US); David Vaught, Dallas, TX (US); Ross Newman, Dallas, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 14/947,139

(22) Filed: Nov. 20, 2015

(65) Prior Publication Data

US 2017/0148443 A1   May 25, 2017

(51) Int. Cl.

| G10L 17/00 | (2013.01) |
|---|---|
| G10L 17/26 | (2013.01) |
| G10L 15/30 | (2013.01) |
| H04R 1/04 | (2006.01) |
| G10L 17/02 | (2013.01) |
| G10L 25/48 | (2013.01) |
| H04R 3/04 | (2006.01) |

(52) U.S. Cl.
CPC ............. *G10L 17/26* (2013.01); *G10L 15/30* (2013.01); *G10L 17/02* (2013.01); *G10L 25/48* (2013.01); *H04R 1/04* (2013.01); *H04R 3/04* (2013.01)

(58) Field of Classification Search
CPC ......... G10L 15/30; G10L 17/02; G10L 25/48; G10L 17/26; H04R 1/04; H04R 3/04
USPC .............................................. 381/81; 704/246
See application file for complete search history.

(56) References Cited

U.S. PATENT DOCUMENTS

| 4,854,885 | A | 8/1989 | Bowden, Jr. et al. |
|---|---|---|---|
| 5,384,838 | A | 1/1995 | Hoffman |
| 5,493,618 | A | 2/1996 | Stevens et al. |
| 5,871,086 | A | 2/1999 | Bachschmid |
| 5,889,871 | A * | 3/1999 | Downs, Jr. ............. H04R 17/00 310/334 |
| 5,914,826 | A | 6/1999 | Smallwood |
| 6,087,588 | A | 7/2000 | Soules |
| 7,022,931 | B2 | 4/2006 | Shimoda et al. |
| 7,139,716 | B1 | 11/2006 | Gaziz |
| 7,997,925 | B2 | 8/2011 | Lam et al. |
| 9,147,398 | B2 * | 9/2015 | White ..................... G10L 15/24 |
| 2003/0013503 | A1 | 1/2003 | Menard et al. |
| 2003/0210770 | A1 | 11/2003 | Krejcarek |

(Continued)

FOREIGN PATENT DOCUMENTS

| EP | 994536 A1 | 10/1990 |
|---|---|---|
| GB | 2410137 | 1/2004 |

*Primary Examiner* — Shaun Roberts
(74) *Attorney, Agent, or Firm* — Scott P. Zimmerman, PLLC

(57) ABSTRACT

A portable acoustic unit is adapted for insertion into an electrical receptacle. The portable acoustic unit has an integrated microphone and a wireless network interface to an automation controller. The portable acoustic unit detects spoken voice commands from users in the vicinity of the electrical receptacle. The portable acoustic unit merely plugs into a conventional electrical outlet to provide an extremely simple means of voice control through a home or business.

20 Claims, 29 Drawing Sheets

(56) References Cited

U.S. PATENT DOCUMENTS

| | | |
|---|---|---|
| 2006/0057873 A1 | 3/2006 | Ortega |
| 2008/0012423 A1* | 1/2008 | Mimran ............... H01R 25/003 307/11 |
| 2009/0216529 A1* | 8/2009 | Bengtsson ............. G10L 21/02 704/233 |
| 2009/0287485 A1* | 11/2009 | Glebe ................ G10L 21/0208 704/233 |
| 2011/0101793 A1 | 5/2011 | Chang |
| 2011/0123043 A1* | 5/2011 | Felberer ............. H04R 19/005 381/94.2 |
| 2011/0297522 A1 | 12/2011 | Elzing |
| 2012/0008802 A1* | 1/2012 | Felber .................... G10L 15/22 381/107 |
| 2013/0058051 A1 | 3/2013 | Casey |
| 2013/0244475 A1* | 9/2013 | Sayadi .................. H01R 13/72 439/501 |
| 2013/0260613 A1 | 10/2013 | Misener |
| 2014/0334640 A1 | 11/2014 | Chan |
| 2015/0077555 A1 | 3/2015 | Scalisi |
| 2015/0086034 A1* | 3/2015 | Lombardi ........... H04L 12/2838 381/81 |
| 2015/0108841 A1 | 4/2015 | Weber et al. |

\* cited by examiner

FIG. 8
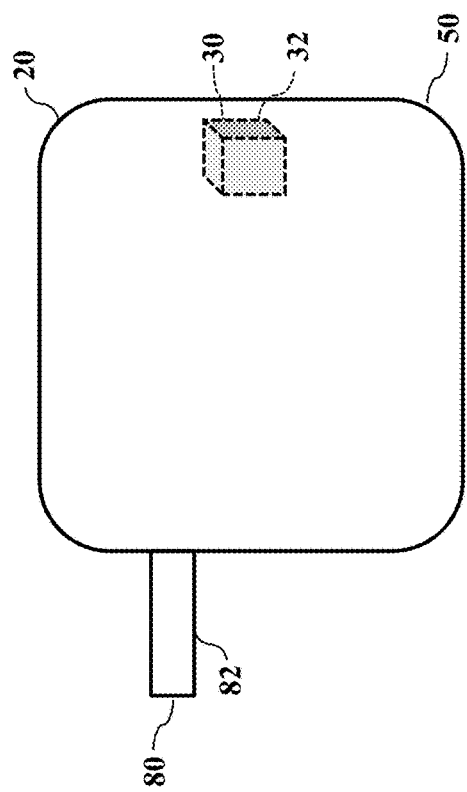
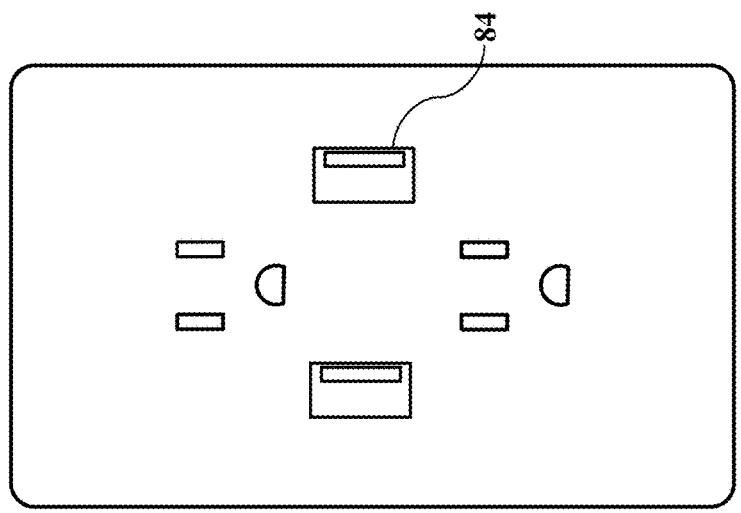

PORTABLE ACOUSTICAL UNIT FOR VOICE RECOGNITION

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

Intercom systems can be found in many homes and businesses. These intercom systems allow occupants in different rooms to communicate. However, conventional intercom systems rely on dedicated wiring or wireless transmission. The dedicated wiring is expensive and usually installed during construction, thus becoming quickly outdated. Conventional wireless intercoms also have limited range and interference issues.

BRIEF DESCRIPTION OF THE SEVERAL VIEWS OF THE DRAWINGS

The features, aspects, and advantages of the exemplary embodiments are better understood when the following Detailed Description is read with reference to the accompanying drawings, wherein:

FIGS. 5-8 are more detailed, exploded illustrations of the portable acoustical unit, according to exemplary embodiments;

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
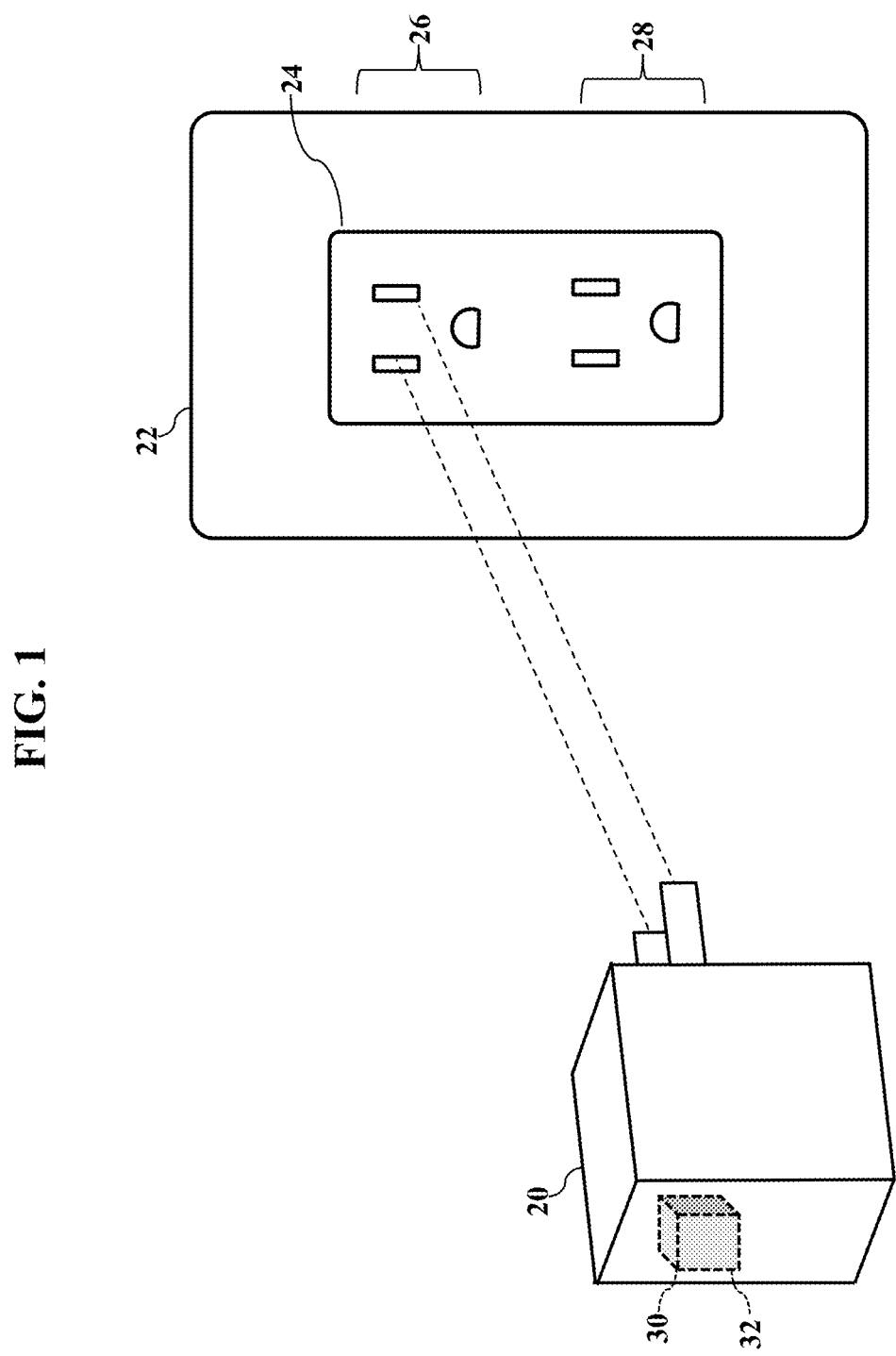
FIGS. 1-4 are simplified illustrations of a portable acoustical unit, according to exemplary embodiments.

FIGS. 1-4 are simplified illustrations of an environment in which exemplary embodiments may be implemented. FIG. 1 illustrates a portable acoustical unit 20 that plugs into an electrical power receptacle 22. The electrical power receptacle 22 is illustrated as the familiar electrical outlet 24 having duplex outlet sockets 26 and 28. The portable acoustical unit 20, however, may have any physical and power configuration (such as a 3-prong or USB plug, as later paragraphs will explain). Regardless, the portable acoustical unit 20 is acoustically responsive. That is, the portable acoustical unit 20 has an acoustic transducer 30 that detects sounds in the vicinity of its installed location. The reader is likely familiar with a microphone, which is a common term for the acoustic transducer 30. This disclosure will thus generally refer to the acoustic transducer 30 as a microphone 32 for familiarity and ease of explanation.

Figure 2:
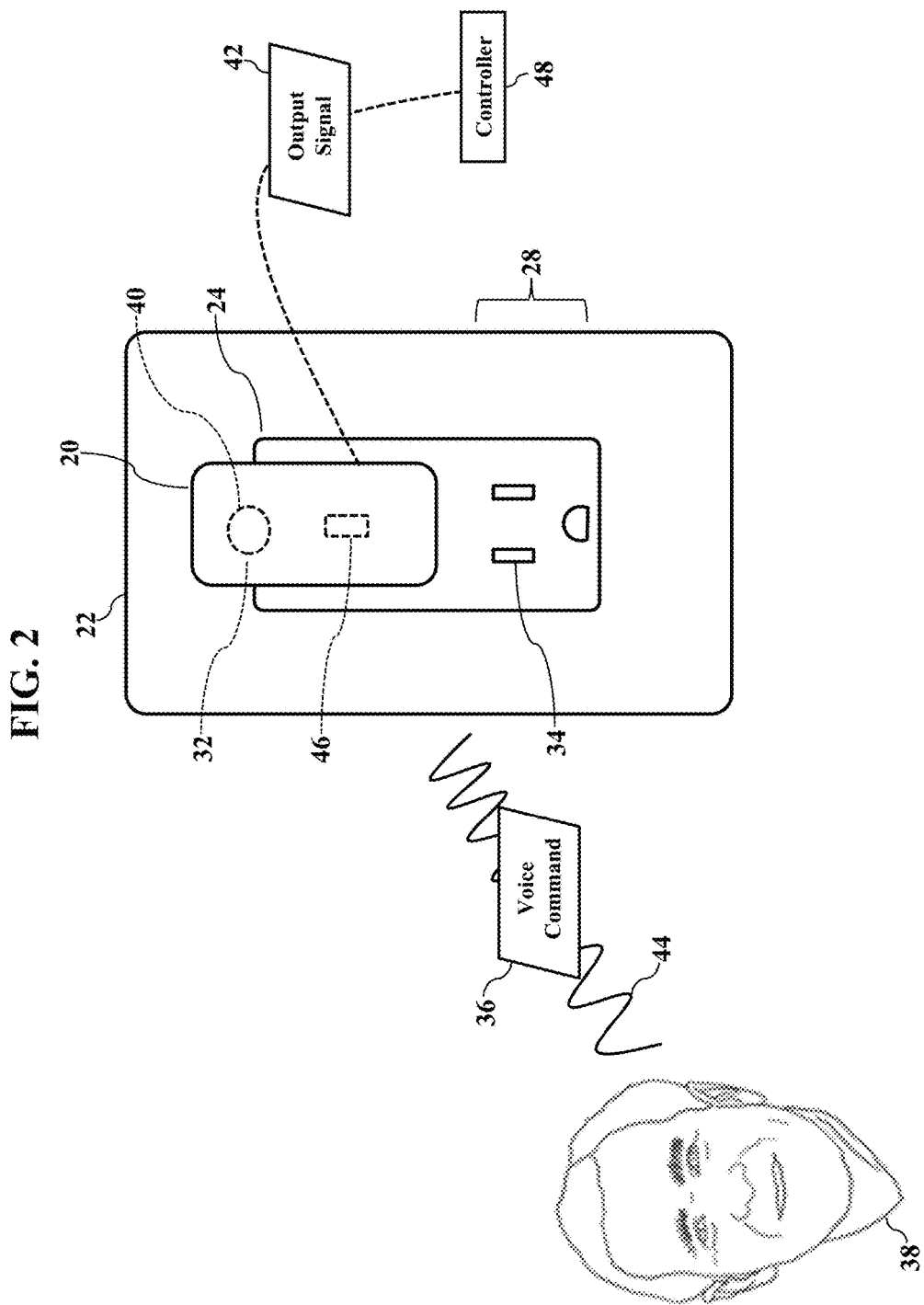

FIG. 2 illustrates voice control. When the portable acoustical unit 20 is plugged into the electrical power receptacle 22, electrical power 34 is provided to the microphone 32. The microphone 32 may thus respond to audible voice commands 36 spoken by a user 38. The user's audible speech is converted to electrical energy by microphone circuitry 40, which will be later explained. The microphone circuitry 40 thus generates an output signal 42 that is representative of sound pressure waves 44 utter by the user. The portable acoustical unit 20 also has a network interface 46 to a communications network (not shown for simplicity).

Exemplary embodiments thus allow the output signal 42 to be sent or conveyed to a controller 48 for interpretation and action. The user 38 may thus speak the voice commands 36 to control appliances, lights, and other automation systems.

Figure 3:
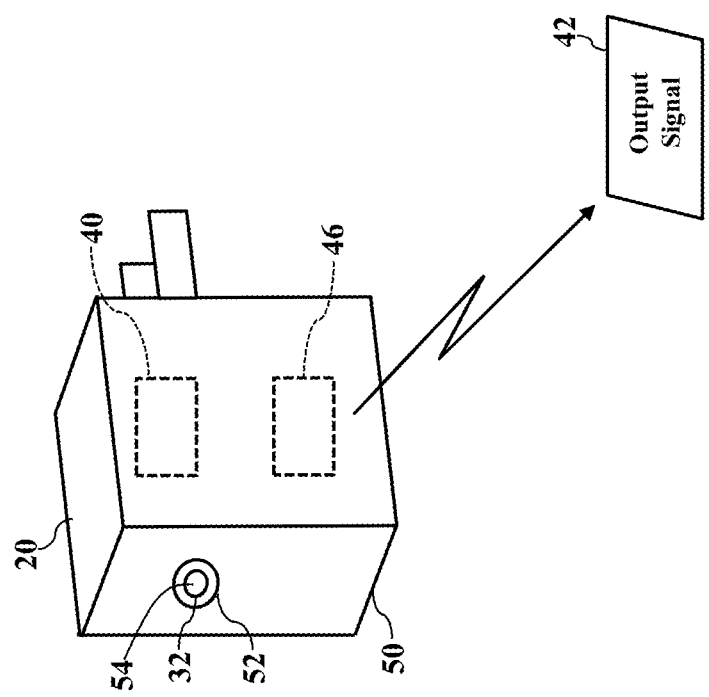

FIG. 3 better illustrates the microphone 32. The portable acoustical unit 20 has an enclosure 50 that houses the internal microphone circuitry 40 and the network interface 46. Even though the microphone circuitry 40 may be enclosed within the enclosure 50, an acoustic aperture 52 exposes a sensory element 54 to ambient sounds (such as the sound pressure waves 44 illustrated in FIG. 2). The sensory element 54 converts incident sound pressure waves 44 into electrical signals. That is, even though the microphone circuitry 40 may be enclosed within and protected by the enclosure 50, the acoustic aperture 52 allows the sensory element 54 to respond to stimulus sounds. The microphone circuitry 40 thus generates the output signal 42 in response to the stimulus acoustic inputs.

Figure 4:
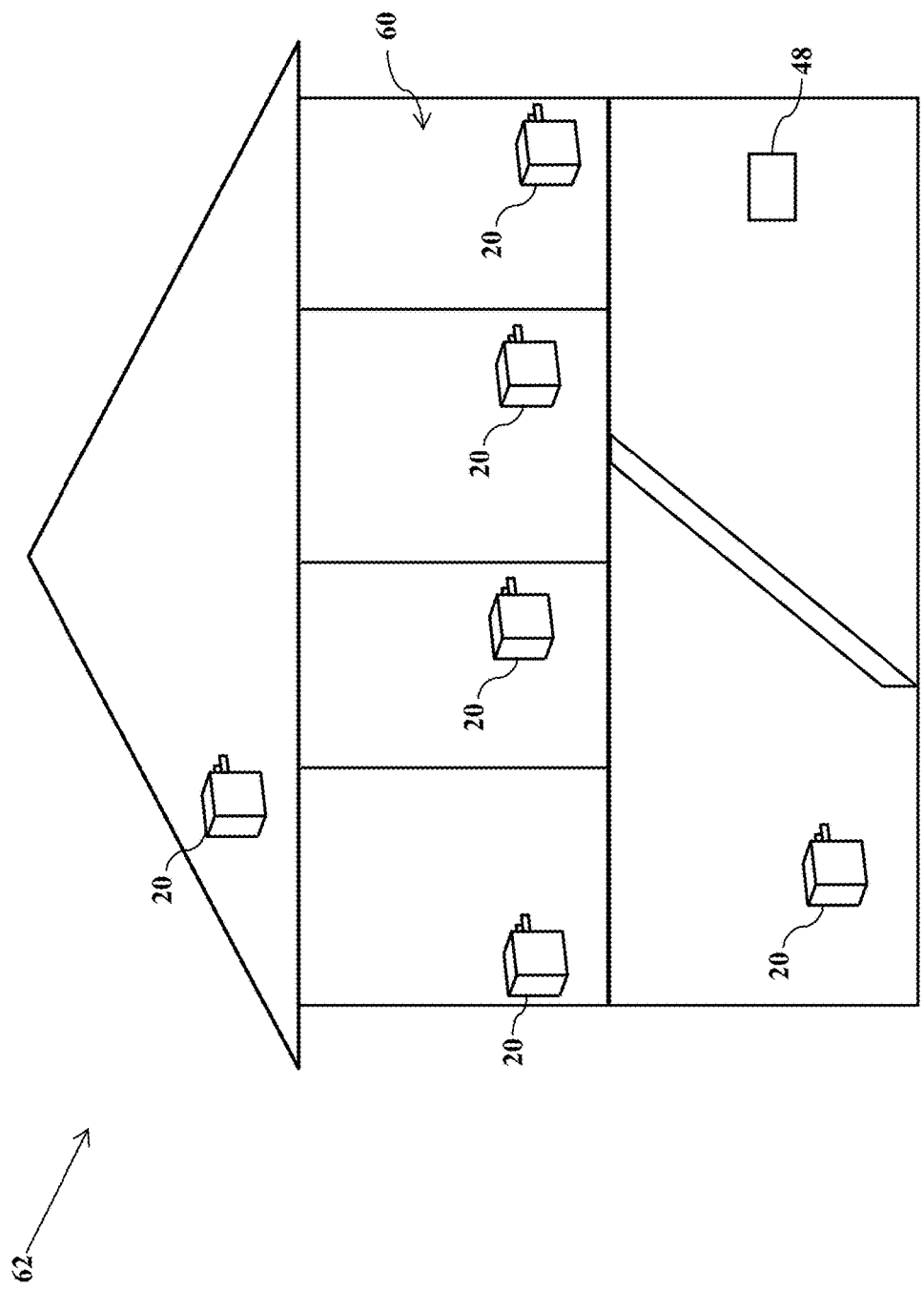

FIG. 4 illustrates a whole-home installation. Here one or more of the portable acoustical units 20 may be installed in each room 60 of a home 62. The portable acoustical unit 20 may thus be deployed or installed in bedrooms, a living room, and bathrooms, thus allowing voice control throughout the home 60 without added wiring. The portable acoustical unit 20, of course, may similarly be installed within the rooms of an office or any other facility. The controller 48 may thus respond to voice commands spoken throughout a building. The portable acoustical unit 20 may even detect and identify the speech of different users in the same room, as later paragraphs will explain. Exemplary embodiments thus distinguish and execute different commands spoken by different users throughout the home or business.

Exemplary embodiments thus enhance the digital home experience. As more people learn about the benefits and conveniences of home control and automation, the cost and difficulty of installation may be an obstacle to wide adoption. Exemplary embodiments thus provide a very simple solution that meshes with the existing electrical wiring distribution system already used by nearly all homes and businesses. No extra wiring is required, and no installation concerns are added. The portable acoustical unit 20 is merely plugged into the existing electrical outlets (such as that illustrated in FIG. 1) to provide elegant, simple, and inexpensive verbal communication and control.

Figure 5:
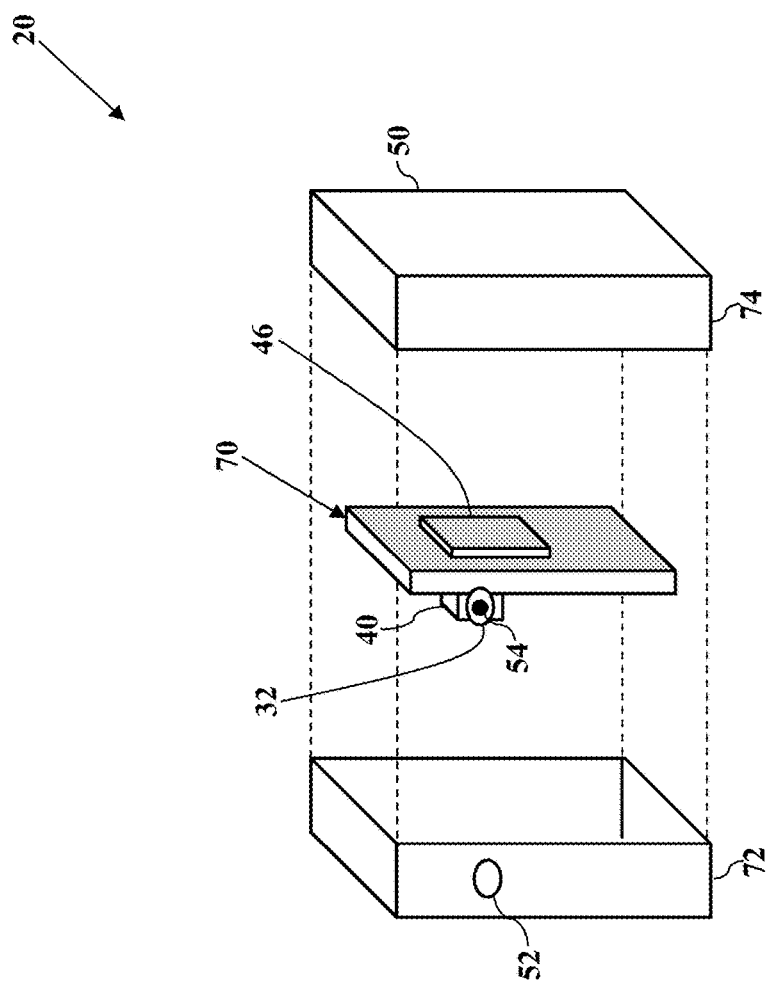

FIGS. 5-8 are more detailed, exploded illustrations of the portable acoustical unit 20, according to exemplary embodiments. The enclosure 50 houses the internal microphone circuitry 40 and the network interface 46 (perhaps fabricated as components of a circuit board 70). While the enclosure 50 may be formed or assembled from one or many pieces, for simplicity FIG. 5 illustrates mating left and right halves 72 and 74. The microphone circuitry 40 and the network interface 46 are thus retained inside the enclosure 50 and generally protected from exposure. The microphone 32 may also be mostly or substantially housed within the enclosure 50 formed by the mating halves 72 and 74. FIG. 5, though, illustrates the acoustic port or aperture 52 in the enclosure 50 that exposes the sensory element 54 to ambient sounds (such as the sound pressure waves 44 illustrated in FIG. 2).

Figure 6:
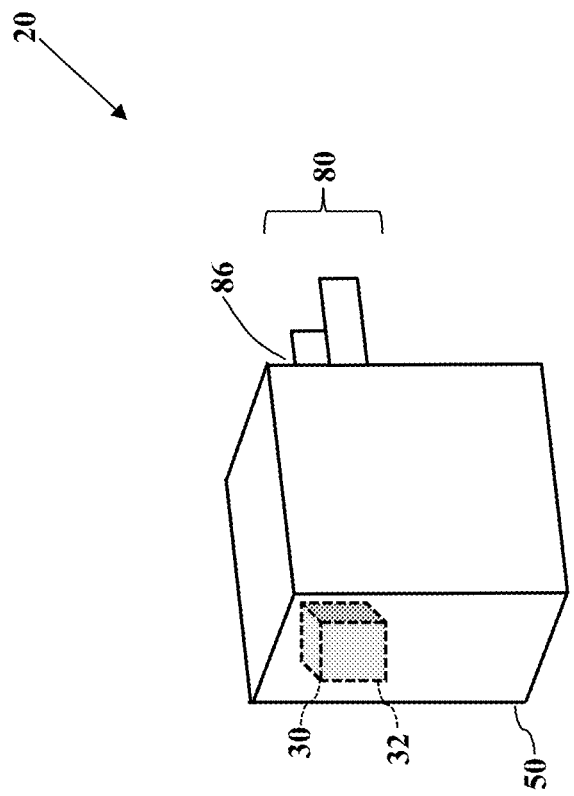
Figure 7:
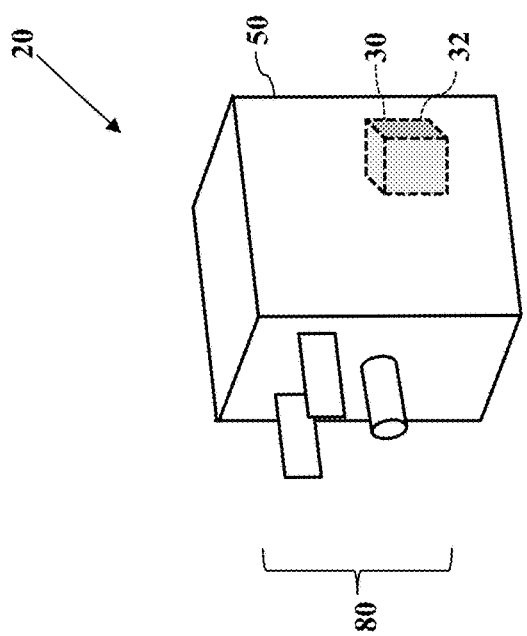

FIGS. 6-8 illustrate a mechanical power plug 80. FIG. 6 illustrates the mechanical power plug 80 as the familiar two-prong male blades that insert into the electrical female outlet sockets 26 and 28 (illustrated in FIG. 1). The enclosure 50 may thus also expose the mechanical power plug 80. FIG. 7 illustrates the mechanical power plug 80 as the familiar grounded three-prong male configuration. FIG. 8 illustrates the mechanical power plug 80 as the universal serial bus (or "USB") connector 82 for insertion into a combination duplex/USB electrical outlet 84. Regardless, the mechanical power plug 80 protrudes through one or more plug apertures 86 in the enclosure 50 (best illustrated in FIG. 6). When electrical energy is applied to the mechanical power plug 80 (perhaps via the electrical power 34 illustrated in FIG. 1), the portable acoustical unit 20 is energized with electrical energy. The microphone 32 thus detects audible words and phrases spoken in its installation vicinity or proximity of the electrical receptacle 22 and/or 84. The user's audible speech (mechanically represented as the sound pressure waves 44) propagates to the microphone 32. The user's audible speech is thus converted to electrical energy by microphone circuitry 40, which will be later explained.

Exemplary embodiments may use any configuration and protocol. The reader should realize that the portable acoustical unit 20 and/or the mechanical power plug 80 may have any size, shape, spacing, and configuration according to governmental and industry standards, safety regulations, electrical current, and electrical voltage. The National Electrical Manufacturers Association (or "NEMA"), for example, defines standards for power plugs and receptacles used for alternating current ("AC") mains electricity in many countries. Different combinations of contact blade widths, shapes, orientation, and dimensions are specified, based on various factors not pertinent here. Moreover, the USB connector 82 is only one example and exemplary embodiments may utilize any connector design, size, and communications protocol.

Figure 9:
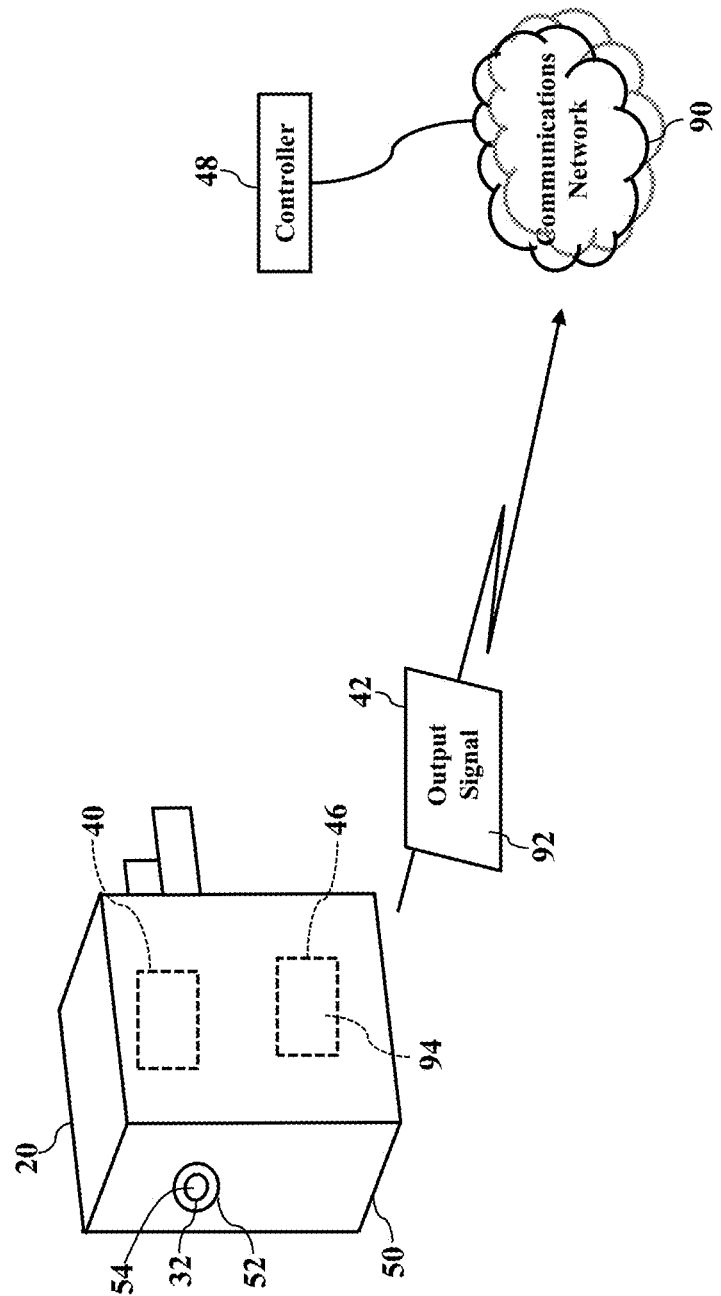
FIGS. 9-13 further illustrate various network interfaces, according to exemplary embodiments.
Figure 10:
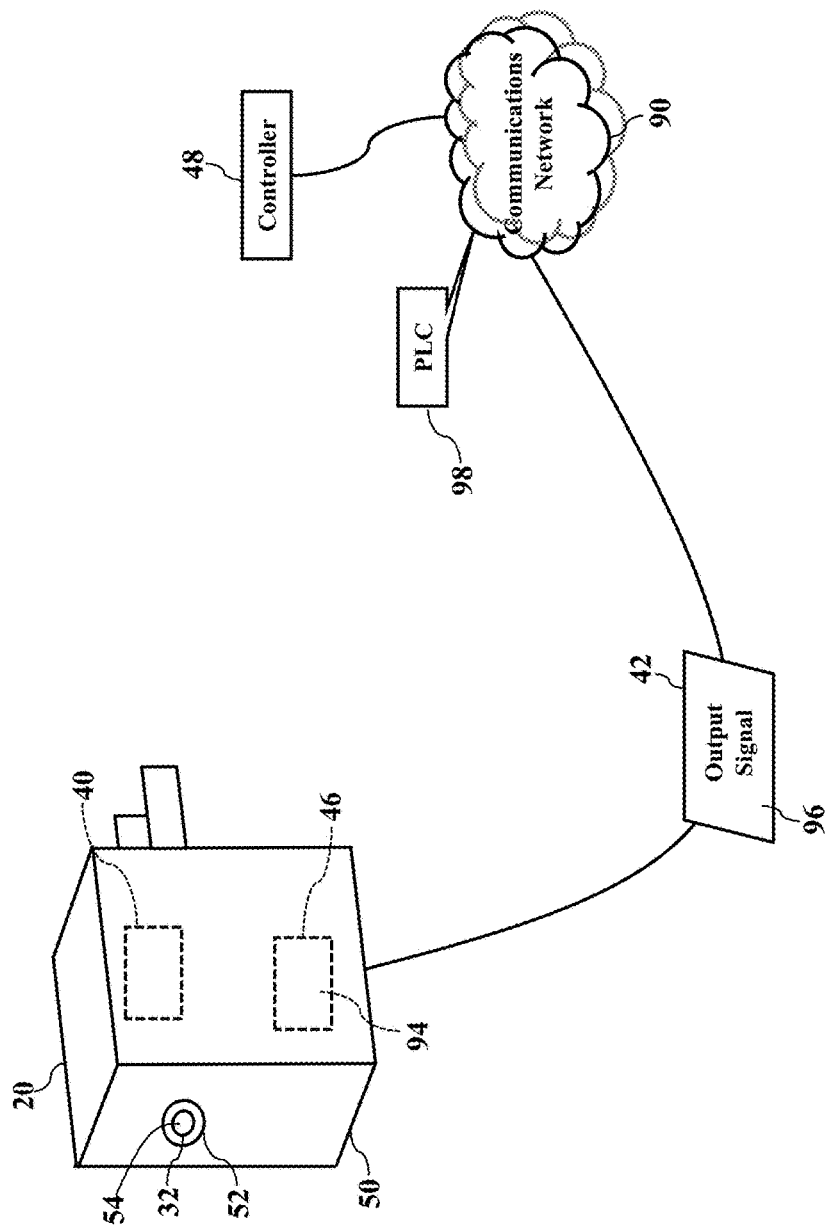

FIGS. 9-13 further illustrate the network interface 46, according to exemplary embodiments. The network interface 46 may also be mostly, substantially, or entirely housed within the enclosure 50. When the microphone circuitry 40 generates the output signal 42, the output signals 42 are received by the network interface 46. The network interface 46 interconnects the portable acoustical unit 20 to a communications network 90. The network interface 46 thus prepares or processes the output signals 42 according to a protocol 92. FIG. 9, for example, illustrates the network interface 46 having wireless capabilities. A transceiver 94, for example, may also be housed within the enclosure 50 and thus wirelessly transmit the output signals 42 as a wireless signal via the wireless communications network 90. FIG. 10, though, illustrates the network interface 46 implementing a packetized Internet Protocol 96 and/or a power line communications (or "PLC") protocol 98 that modulates the output signal 42 onto conductors of electrical wiring. Exemplary embodiments, though, may utilize any hardware or software network interface. The network interface 46 thus sends data or information representing the output signals 42 as messages or signals to any destination, such as a network address associated with the controller 48. The controller 48 thus interprets the output signals 42 for voice recognition and/or automated control.

Figure 11:
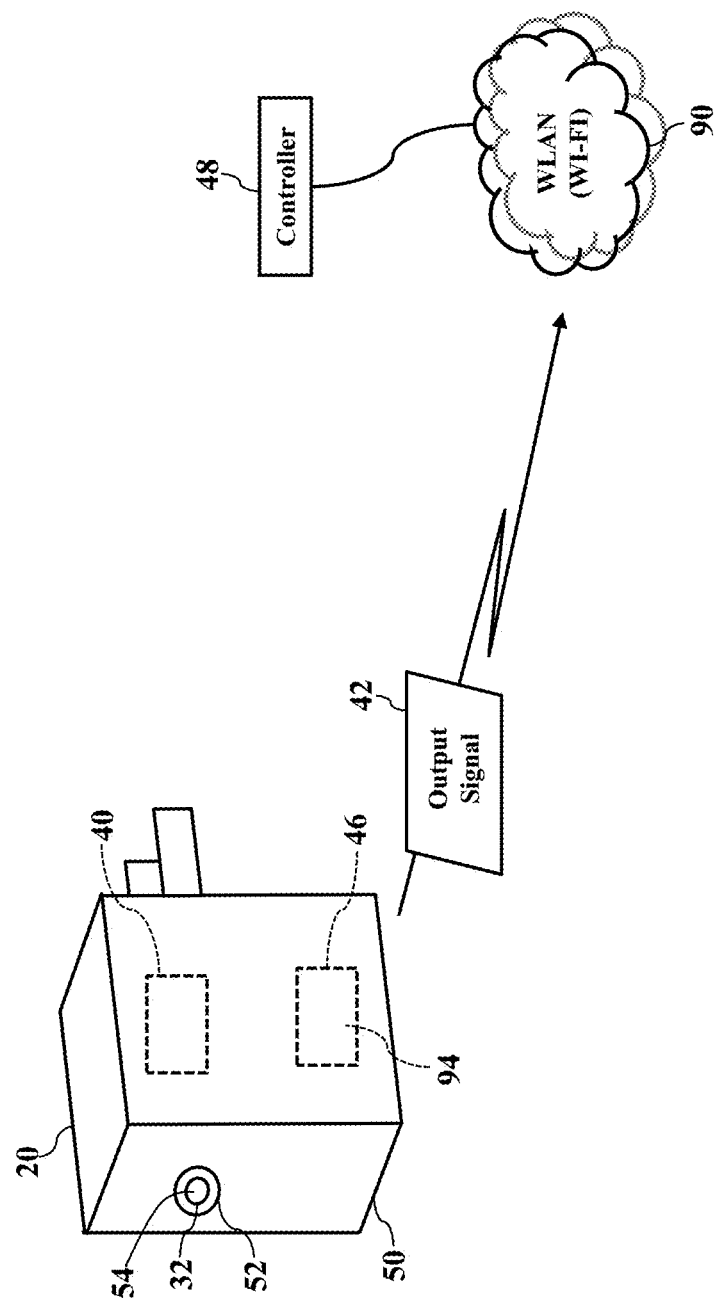
Figure 12:
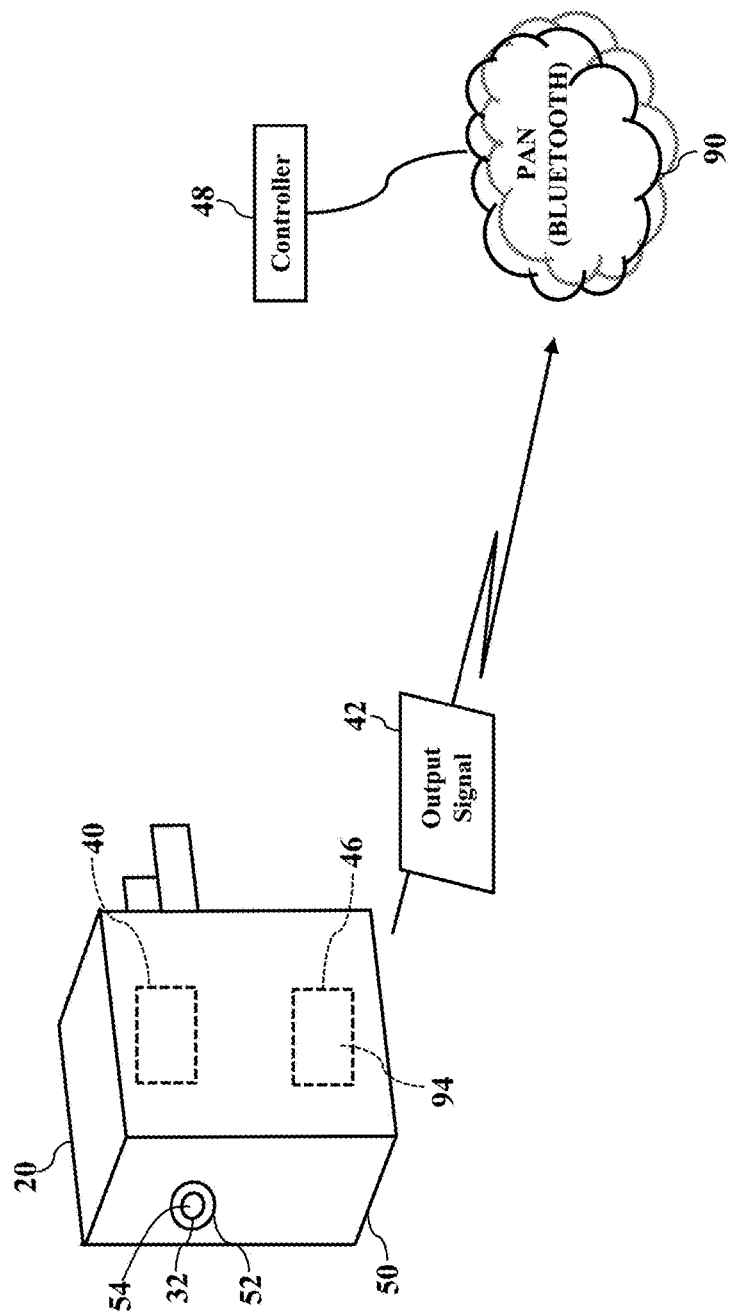
Figure 13:
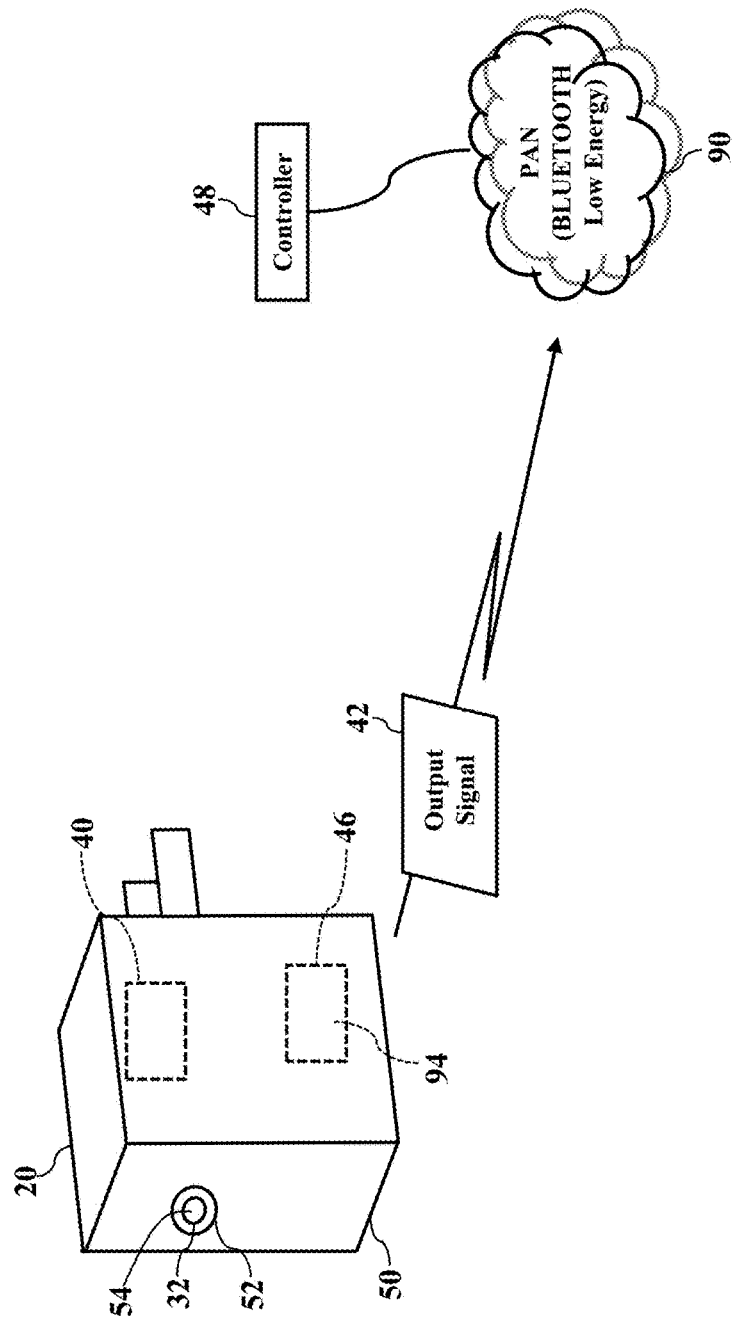

FIGS. 11-13 illustrate additional wireless networking. Here the network interface 46, the transceiver 94, and/or the communications network 90 may utilize any wireless technology or standard. FIG. 11, for example, illustrates the I.E.E.E. 802.11 standard for wireless local area networking (or "WLAN," such as the WI-FI® Alliance). FIG. 12 illustrates the BLUETOOTH® personal area networking (or "PAN") standard that uses short-wavelength UHF radio waves in the ISM band. FIG. 13 illustrates the BLUETOOTH® low energy personal area networking standard that reduces power consumption.

As FIGS. 9-13 illustrate, exemplary embodiments may be applied regardless of networking environment. Exemplary embodiments may be easily adapted to stationary or mobile devices having cellular, WI-FI®, near field, and/or BLUETOOTH® capability. Exemplary embodiments may be applied to mobile devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web"), an intranet, a local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Exemplary embodiments may packetize. The network interface 46 and/or the transceiver 94 may packetize communications or messages into packets of data according to a packet protocol, such as the Internet Protocol. The packets of data contain bits or bytes of data describing the contents, or payload, of a message. A header of each packet of data may contain routing information identifying an origination address and/or a destination address. There are many different known packet protocols, and the Internet Protocol is widely used, so no detailed explanation is needed.

Figure 14:
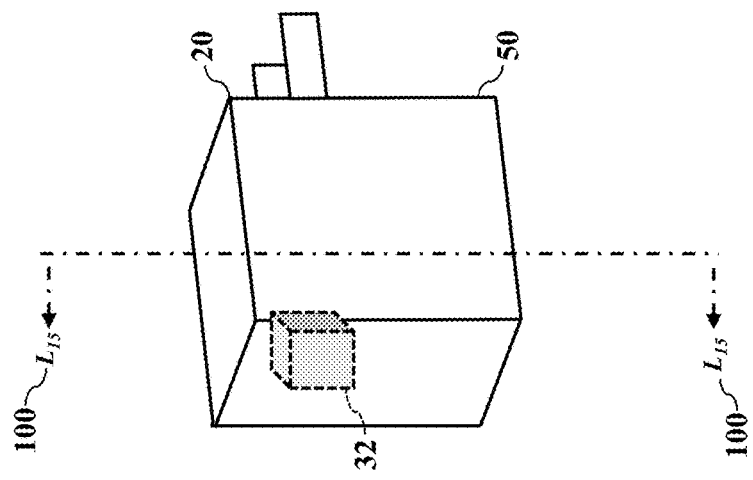
FIGS. 14-15 illustrate an outer enclosure of the portable acoustical unit, according to exemplary embodiments.
Figure 15:
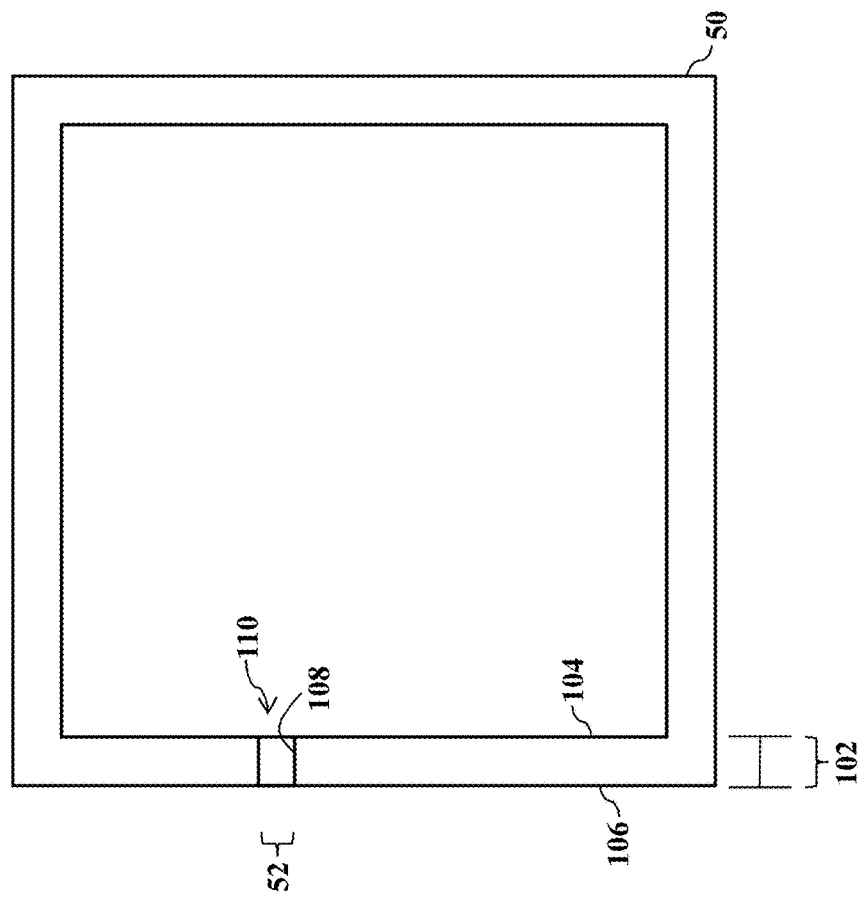

FIGS. 14-15 are more illustrations of the enclosure 50, according to exemplary embodiments. FIG. 15 illustrates sectional views of the enclosure 50 taken along line $L_{15}$ (illustrated as reference numeral 100) of FIG. 14. The sectional views may be enlarged for clarity of features and, for simplicity, merely illustrate the acoustic aperture 52. Even though the enclosure 50 may have any shape and size to suit different designs and needs, here the enclosure 50 resembles a self-contained rectangular box or "brick." The enclosure 50 has a material thickness 102 defined by an inner surface 104 and an outer surface 106. The acoustic aperture 52 has an inner wall 108 defining a cross-sectional area 110. While the acoustic aperture 52 may have any cross-sectional shape, this disclosure mainly illustrates a simple circular cross-sectional shape with the circumferential inner wall 108 defining a circular hole, passage, or inlet. The acoustic aperture 52 may thus extend through the material thickness 102 from the inner surface 104 to the outer surface 106.

Figure 16:
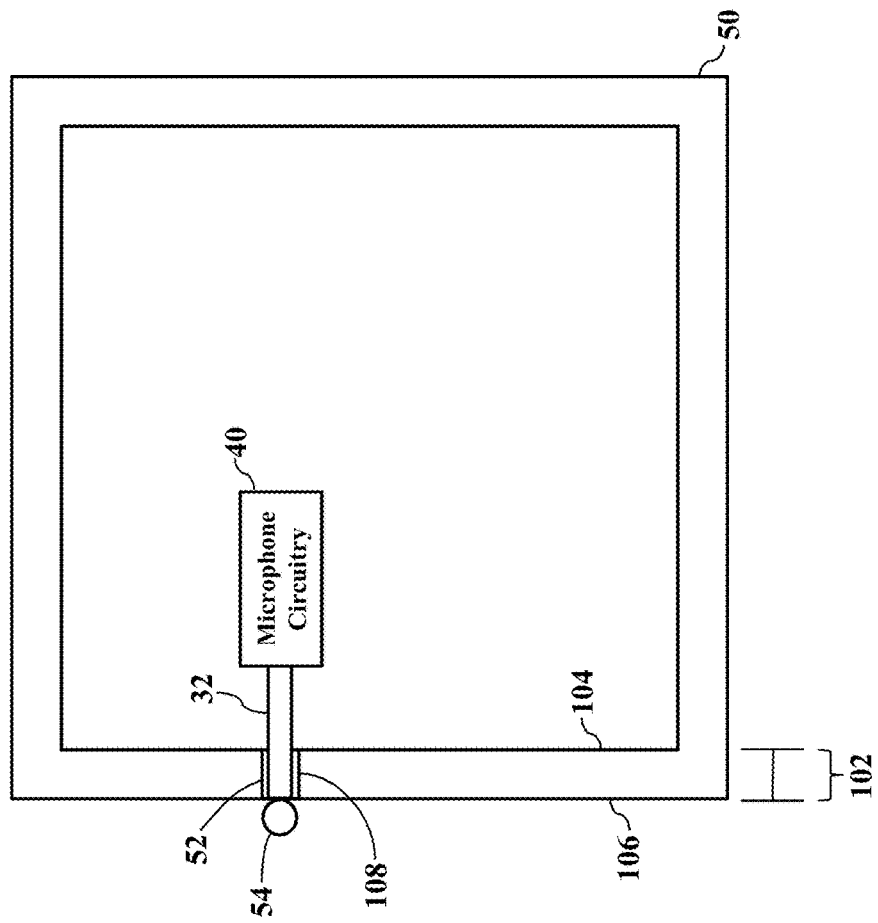
FIGS. 16-18 illustrate different positions of a sensory element, according to exemplary embodiments
Figure 17:
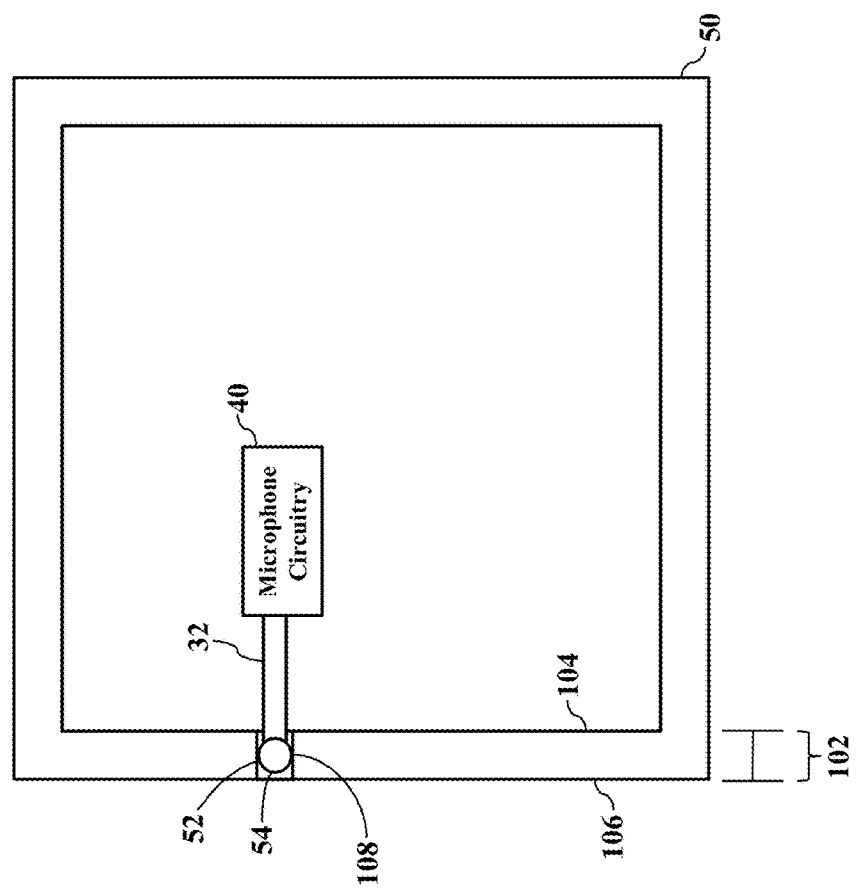
Figure 18:
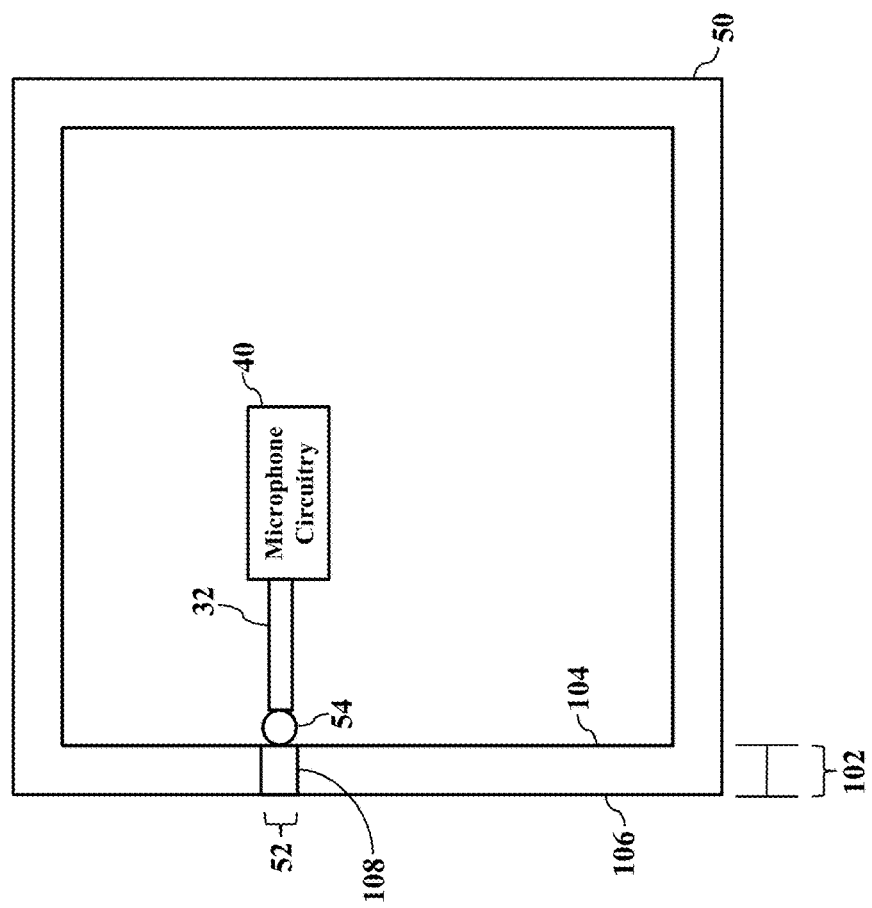

FIGS. 16-18 illustrate different positions of the sensory element 54, according to exemplary embodiments. FIG. 16, for example, illustrates the sensory element 54 sized for insertion into and through acoustic aperture 52. The sensory element 54 may thus outwardly extend beyond the outer surface 106 of the enclosure 50 to detect propagating sounds. The remaining componentry of the microphone 32 (such as the microphone circuitry 40) may be located elsewhere, as desired or needed. FIG. 17, though, illustrates the sensory element 54 arranged or aligned within the acoustic aperture 52, but the sensory element 54 may not outwardly extend beyond the outer surface 106. The sensory element 54, in other words, may be positioned between the inner surface 104 and the outer surface 106 within the material thickness 102. FIG. 18 illustrates the sensory element 54 still arranged or aligned with the acoustic aperture 52, but the sensory element 54 may not extend past the inner surface 104. The sensory element 54 may thus be protected from damage beyond the outer surface 106, but the acoustic aperture 52 guides the sound pressure waves 44 (illustrated in FIG. 1) to the sensory element 54. The acoustic aperture 52 may thus be an acoustic waveguide that reflects and directs the sound pressure waves 44 to the sensory element 54.

Figure 19:
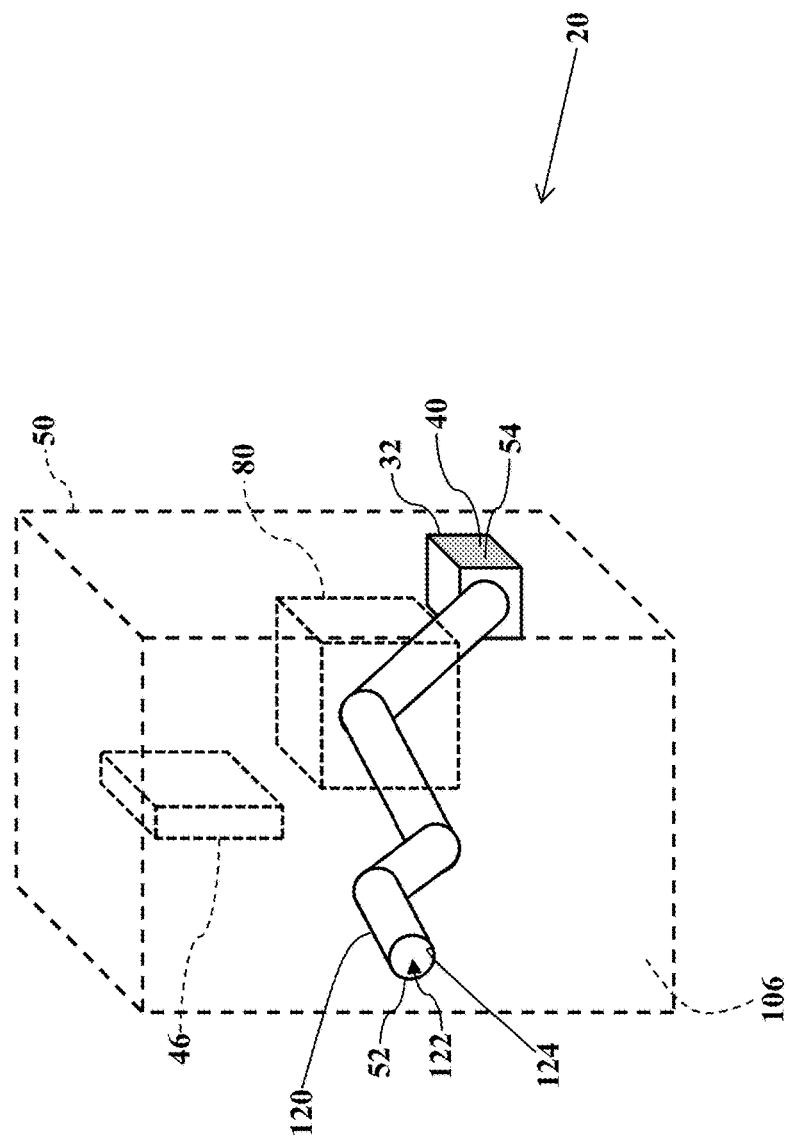
FIG. 19 illustrates an acoustic tube, according to exemplary embodiments.

FIG. 19 illustrates an acoustic tube 120, according to exemplary embodiments. Here the enclosure 50 is shown in hidden view to illustratively emphasize the acoustic tube 120. There may be many situations in which the internal electrical componentry of the portable acoustical unit 20 (such as the network interface 46 and the mechanical power plug 80) may restrict the physical locations for the microphone 32 (such as the sensory element 54 and/or the microphone circuitry 40). The acoustic aperture 52 may act as an acoustic inlet 122 to the acoustic tube 120. The acoustic tube 120 has a length, shape, and configuration that extends from the inner surface 104 (illustrated in FIGS. 15-18) of the enclosure 50 to the sensory element 54 housed within the enclosure 50. The acoustic tube 120 may have one or more straight sections, bends, and/or curves that snake through the internal componentry of the portable acoustical unit 20 to the sensory element 54 and/or to the microphone circuitry 40. The acoustic tube 120 may thus be an acoustic waveguide that reflects and directs the sound pressure waves 44 (illustrated in FIG. 1) around or through or around the mechanical power plug 80 to the sensory element 54. The acoustic tube 120 may thus have an inner tubular wall 124 defining any cross-sectional shape or area. For simplicity, FIG. 19 illustrates a circular cross-section that aligns with or mates with the acoustic aperture 52. The sensory element 54 may thus be physically located at any position or location within the enclosure 50. The acoustic tube 120 directs the sound pressure waves 44 to the sensory element 54, regardless of its internal location within the enclosure 50. The acoustic tube 120 may have a cross-sectional shape, diameter, length, and routing to suit any design need or packaging limitation.

Figure 20:
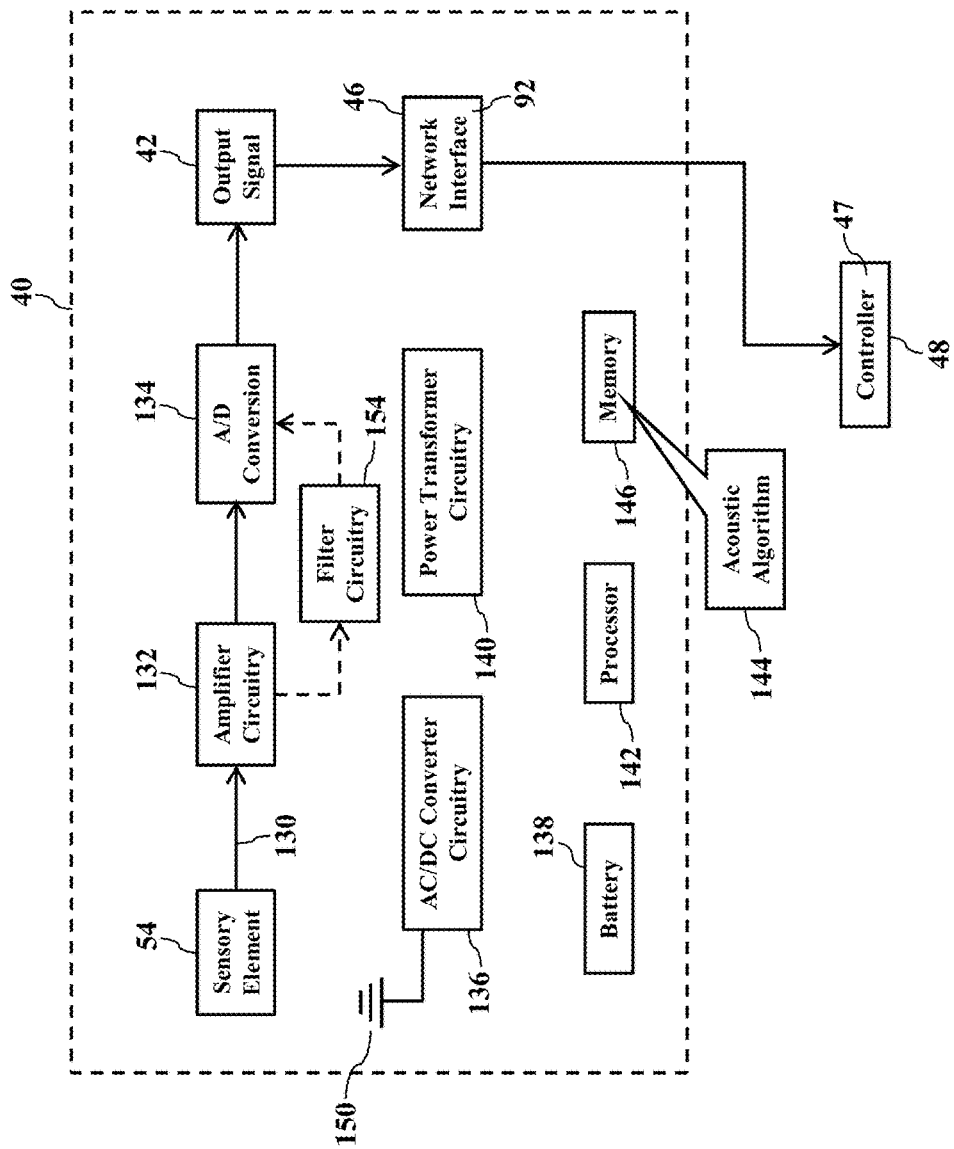
FIG. 20 is a block diagram of microphone circuitry, according to exemplary embodiments.

FIG. 20 is a block diagram of the microphone circuitry 40, according to exemplary embodiments. There are many different microphone designs and circuits, so FIG. 20 only illustrates the basic components. The sensory element 54 detects audible words and phrases spoken by a user in the vicinity or proximity of the portable acoustical unit 20 (such as when engaging the electrical outlet 24 or 84 illustrated in FIGS. 1 and 8). The sensory element 54 converts the sound pressure waves 44 (illustrated in FIG. 1) into electrical energy 130 having a current, voltage, and/or frequency. An output of the sensory element 54 may be small, so amplifier circuitry 132 may be used. If the sensory element 54 produces an analog output, an analog-to-digital converter 134 may then be used to convert an output of the amplifier circuitry 132 to a digital form or signal. The microphone circuitry 40 thus generates the output signal 42 that is representative of the sound pressure waves 44. The output signals 42 are received by the network interface 46 and prepared or processed according to the protocol 92. The network interface 46, for example, may wirelessly send the output signals 42 using a cellular, WI-FI®, or BLUETOOTH® protocol or standard. However, the network interface 46 may modulate the output signals 42 according to power line communications ("PLC") protocol or standard. Regardless, the network interface 46 addresses the output signals 42 to any destination, such as the network address 47 associated with the controller 48. The controller 48 thus interprets the output signals 42 for voice recognition and/or automated control.

Exemplary embodiments may also include power conversion. As the reader may realize, the portable acoustical unit 20 may receive alternating current ("AC") electrical power (current and voltage). The microphone circuitry 40, though, may require direct current ("DC") electrical power. The microphone circuitry 40 may thus include an AC/DC converter circuitry 136 that converts the alternating current electrical power into direct current electrical power. The direct current electrical power is thus distributed to the sensory element 54 and to the microphone circuitry 40. The microphone circuitry 40 may further include a battery 138 for continued operation when the alternating current ("AC") electrical power is not available.

Exemplary embodiments may also include power transformation. The alternating current electrical power (perhaps provided by the electrical outlets 24 or 84 illustrated in FIGS. 1 and 8 or the USB connector 80 illustrated in FIG. 8) may be at a different voltage that required by the microphone circuitry 40. For example, in North America the electrical grid delivers 120 Volts AC at 60 Hz. The microphone circuitry 40, though, may require 5 Volts DC or even less. Power transformer circuitry 140 may thus be included to transform electrical power to a desired driver voltage and/or current.

Exemplary embodiments may utilize any microphone technology. Some microphones have a vibrating diaphragm. Some microphones are directional and others are omnidirectional. Different microphone designs have different frequency response characteristics and different impedance characteristics. Some microphones are even manufactured using micro-electro-mechanical systems (or "MEMS") technology. The microphone technology is not important, as exemplary embodiments may be utilized with any microphone technology or manufacturing process.

Exemplary embodiments may be processor controlled. The portable acoustical unit 20 and/or the microphone circuitry 40 may also have a processor 142 (e.g., "µP"), application specific integrated circuit (ASIC), or other component that executes an acoustic algorithm 144 stored in a memory 146. The acoustic algorithm 144 is a set of programming, code, or instructions that cause the processor 142 to perform operations, such as commanding the sensory element 54, the amplifier circuitry 132, the analog-to-digital converter 136, the power transformer circuitry 140, and/or the network interface 46. Information and/or data may be sent or received as packets of data according to a packet protocol (such as any of the Internet Protocols). The packets of data contain bits or bytes of data describing the contents, or payload, of a message. A header of each packet of data may contain routing information identifying an origination address and/or a destination address.

A connection to electrical ground 150 is also provided. Because the portable acoustical unit 20 may be physically connected to electrical wiring, the portable acoustical unit 20 may have an available physical connection to one of the conductors providing electrical ground 150. Even one of the conductors connected to neutral may provide the electrical ground 150.

The microphone circuitry 40 may optionally include filter circuitry 154. Exemplary embodiments may be tuned or designed for certain ranges or bands of frequencies. For example, the human voice is typically very low frequencies (85-300 Hz). If the portable acoustical unit 20 is used for voice control, the user will likely not speak commands outside the human voice range of frequencies. Exemplary embodiments may thus ignore, or filter out, frequencies not of interest (such as inaudible frequencies) to save processing capability. The filter circuitry 154 may thus be used to avoid wasting resources on unwanted or undesired frequencies.

Exemplary embodiments may utilize any processing component, configuration, or system. Any processor could be multiple processors, which could include distributed processors or parallel processors in a single machine or multiple machines. The processor can be used in supporting a virtual processing environment. The processor could include a state machine, application specific integrated circuit (ASIC), programmable gate array (PGA) including a Field PGA, or state machine. When any of the processors execute instructions to perform "operations", this could include the processor performing the operations directly and/or facilitating, directing, or cooperating with another device or component to perform the operations.

Figure 21:
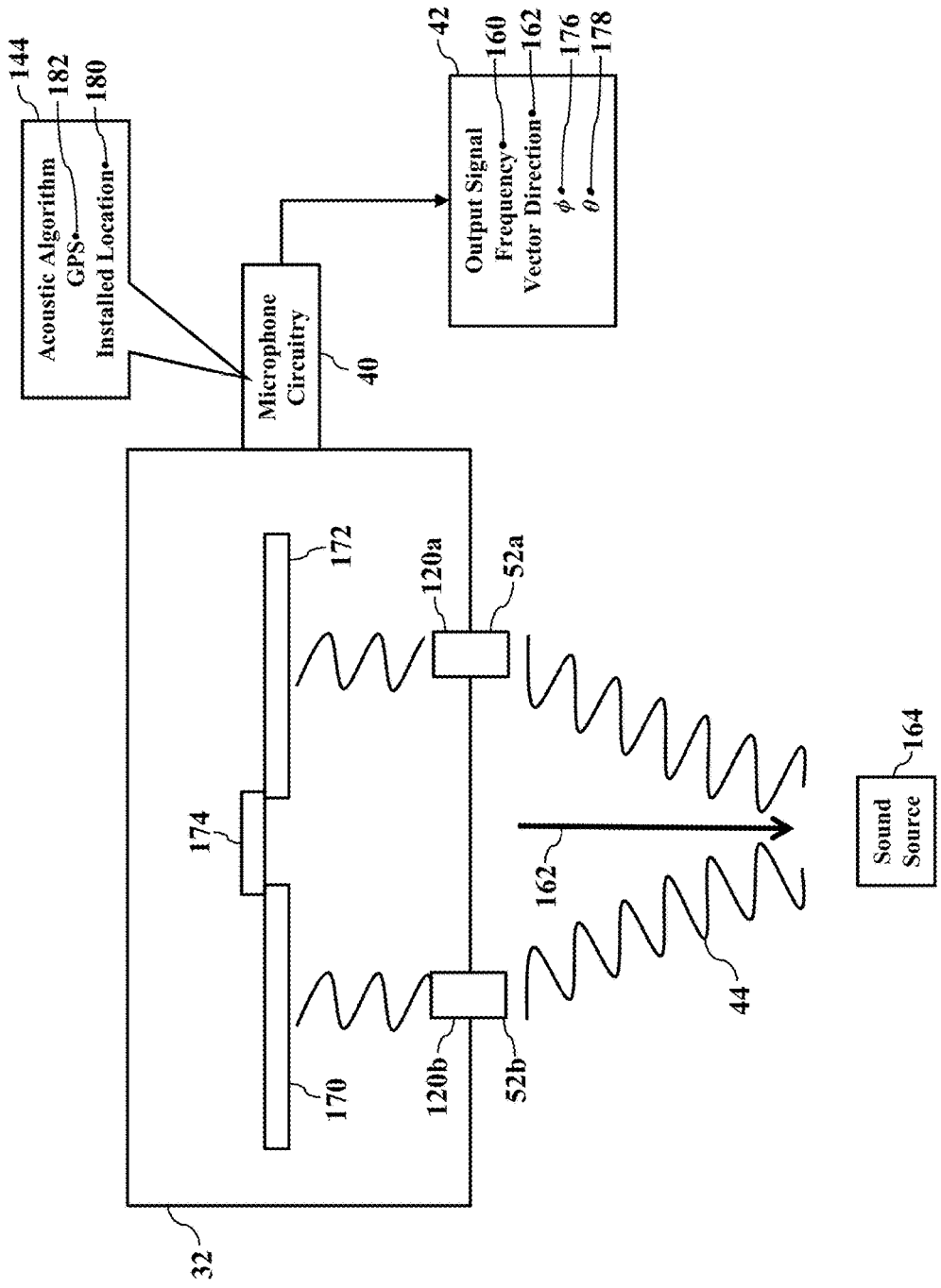
FIG. 21 further illustrates a microphone, according exemplary embodiments.
Figure 22:
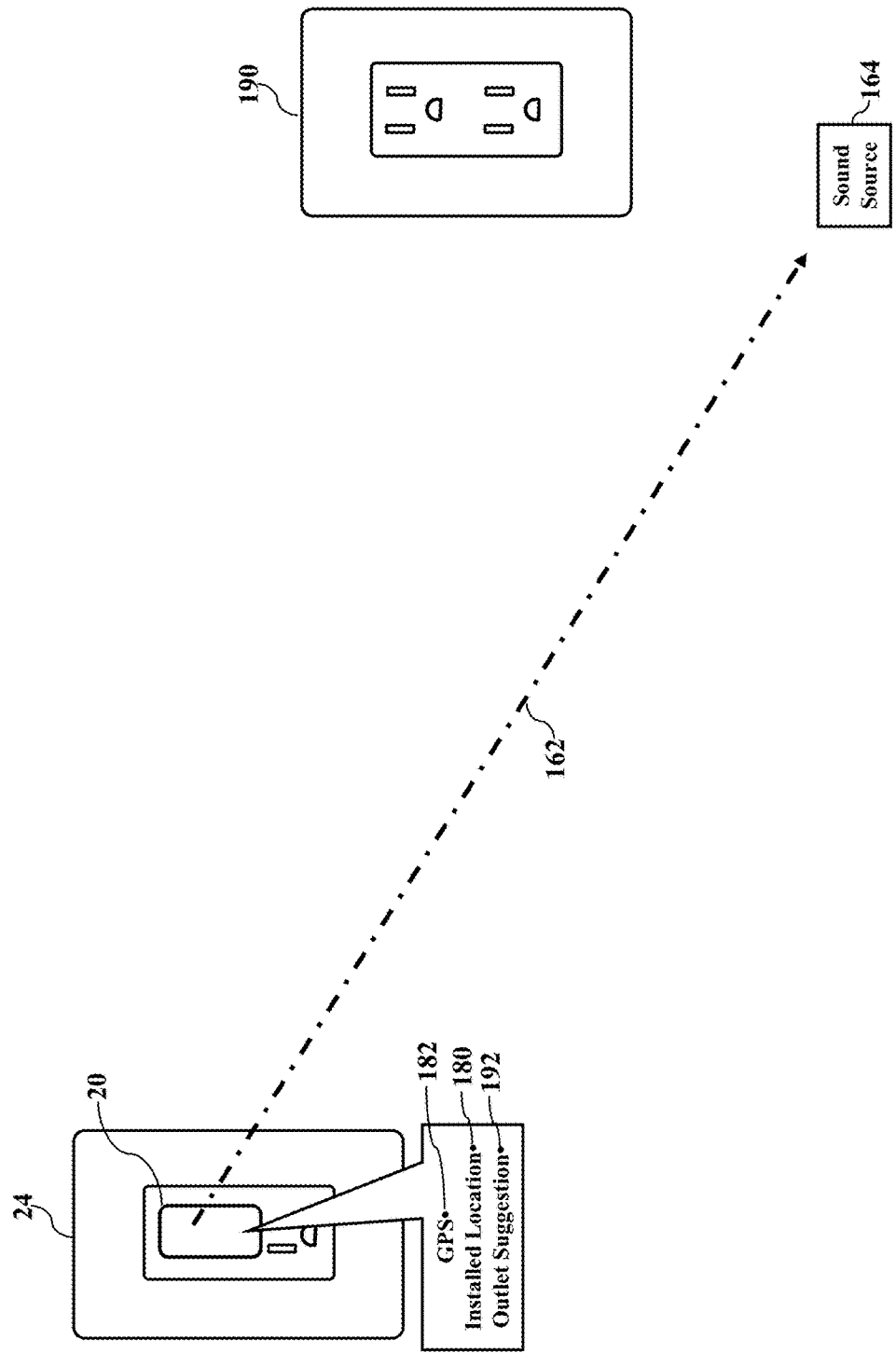
FIGS. 22-25 illustrate locational selection, according to exemplary embodiments.

FIG. 21 further illustrates the microphone 32, according to exemplary embodiments. Here the output signal 42 generated by the microphone circuitry 40 may represent or indicate a frequency $f_s$ (illustrated as reference numeral 160) and a vector direction 162 produced by a sound source 164 (such as the stimulus sound pressure waves 44 representing the user's spoken voice commands 36 illustrated in FIG. 1). While any acoustic sensing technology may be used, FIG. 21 illustrates a physical structure based on the tympanic membranes of the *Ormia ochracea* fly. This physical structure is well known for directional sound sensing, so no detailed explanation is needed. In simple words, the microphone 32 has two (2) or more compliant membranes 170 and 172. The compliant membranes 170 and 172 are illustrated in an enlarged view for clarity, although their physical size may be adapted to suit any need or response. A bridge 174 physically connects or couples the membranes 170 and 172. Here the stimulus sound pressure waves 44 enter the enclosure 50 via two (2) acoustic apertures 52a and 52b (and perhaps propagating along corresponding acoustic tubes 120a and 120b) as inlet canals. The sound pressure waves 44 cause the membranes 170 and 172 to vibrate (due to incident acoustic pressure). The vibrations of the membranes 170 and 172 may also impart a motion to the bridge 174. The membranes 170 and 172 may thus vibrate in or out of phase, depending on acoustic direction, delivery, and propagation. The physical properties of the membranes 170 and 172 and the bridge 174 may thus be chosen to detect the sound pressure waves 44. When the sound pressure waves 44 excite the microphone 32, the microphone 32 generates the output signal 42 representing the frequency 160 and the vector direction 162 associated with the sound pressure waves 44.

FIG. 21 also illustrates vectorization. Here exemplary embodiments may generate the vector direction 162 of the stimulus sound pressure wave 44 in three-directions or dimensions from the microphone 32 to the sound source 164. The microphone 32, in other words, locates the sound source 164 and generates a turning angle φ (illustrated as reference numeral 176) and an azimuth angle θ (illustrated as reference numeral 178). The microphone 32 thus identifies the vector direction 162 by determining the turning angle φ and orienting to the azimuth angle θ. The microphone circuitry 40 may thus report the vector direction 162 to the sound source 164 using the turning angle φ and the azimuth angle θ. Suppose, for example, the acoustic algorithm 144 causes the processor 142 (illustrated in FIG. 20) to retrieve an installed location 180 associated with the portable acoustical unit 20. The installed location 180 may be best represented as global positioning system ("GPS") information 182 describing the installed location 180 of the portable acoustical unit 20. The global positioning system information 182 may be pre-determined and retrieved from the local memory 146 (also illustrated in FIG. 20), or a GPS receiver (not shown for simplicity) operating in the portable acoustical unit 20 may determine the global positioning system information 182. Regardless, once the global positioning system information 182 is known, the vector direction 162 may be determined. Assuming an origin (e.g., 0, 0, 0) at the installed location 180, the vector direction 162 orients to the turning angle φ and to the azimuth angle θ (assuming a spherical coordinate system). The radius R, of course, may be unknown, as the microphone circuitry 40 only reported the localized vector direction 162 in terms of the turning angle φ and the azimuth angle θ. Alternatively, any of these outputs 42 may be sent to the controller 48 (also illustrated in FIG. 20), thus allowing the controller 48 to retrieve the installed location 180 and to determine the vector direction 162 oriented to the turning angle φ and to the azimuth angle θ. Either solution yields three-directions of the vector direction 162 to the sound source 164.

FIGS. 22-25 illustrate locational selection, according to exemplary embodiments. Here the portable acoustical unit 20 may suggest a different operating location, based on the vector direction 162 to the sound source 164. That is, even though the portable acoustical unit 20 may be plugged into the electrical outlet 24 associated with the installed location 180, the portable acoustical unit 20 may analyze the vector direction 162 and select a different electrical outlet (illustrated as reference numeral 190) that is physically closer to the sound source 164. Because the different electrical outlet 190 is radially closer to the user (e.g., the sound source 164), the microphone 32 may have better acoustical reception. Exemplary embodiments may thus generate an outlet suggestion 192 to move the portable acoustical unit 20 to the different electrical outlet 190 that is closer to the user (e.g., the sound source 164).

Figure 23:
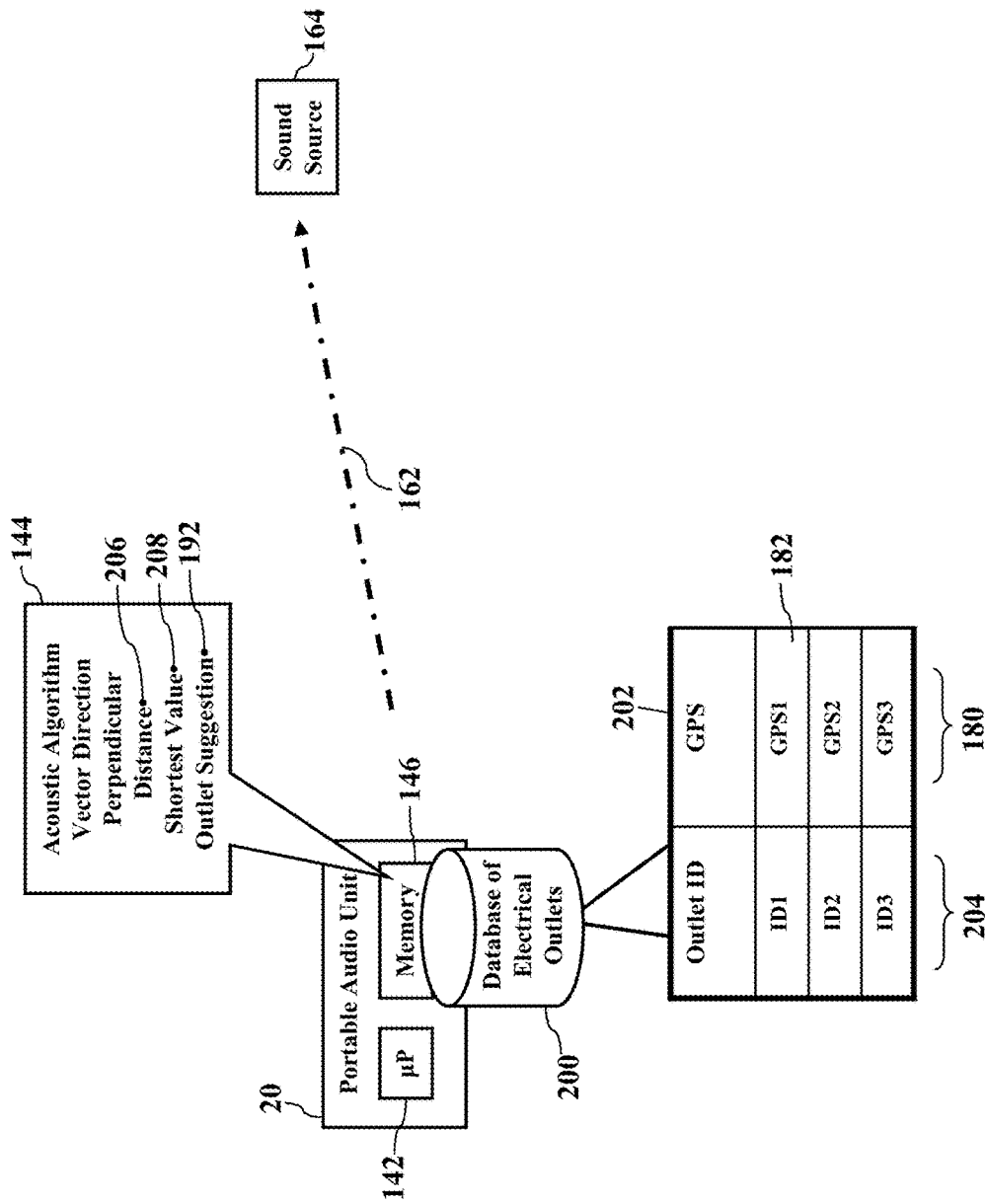
Figure 24:
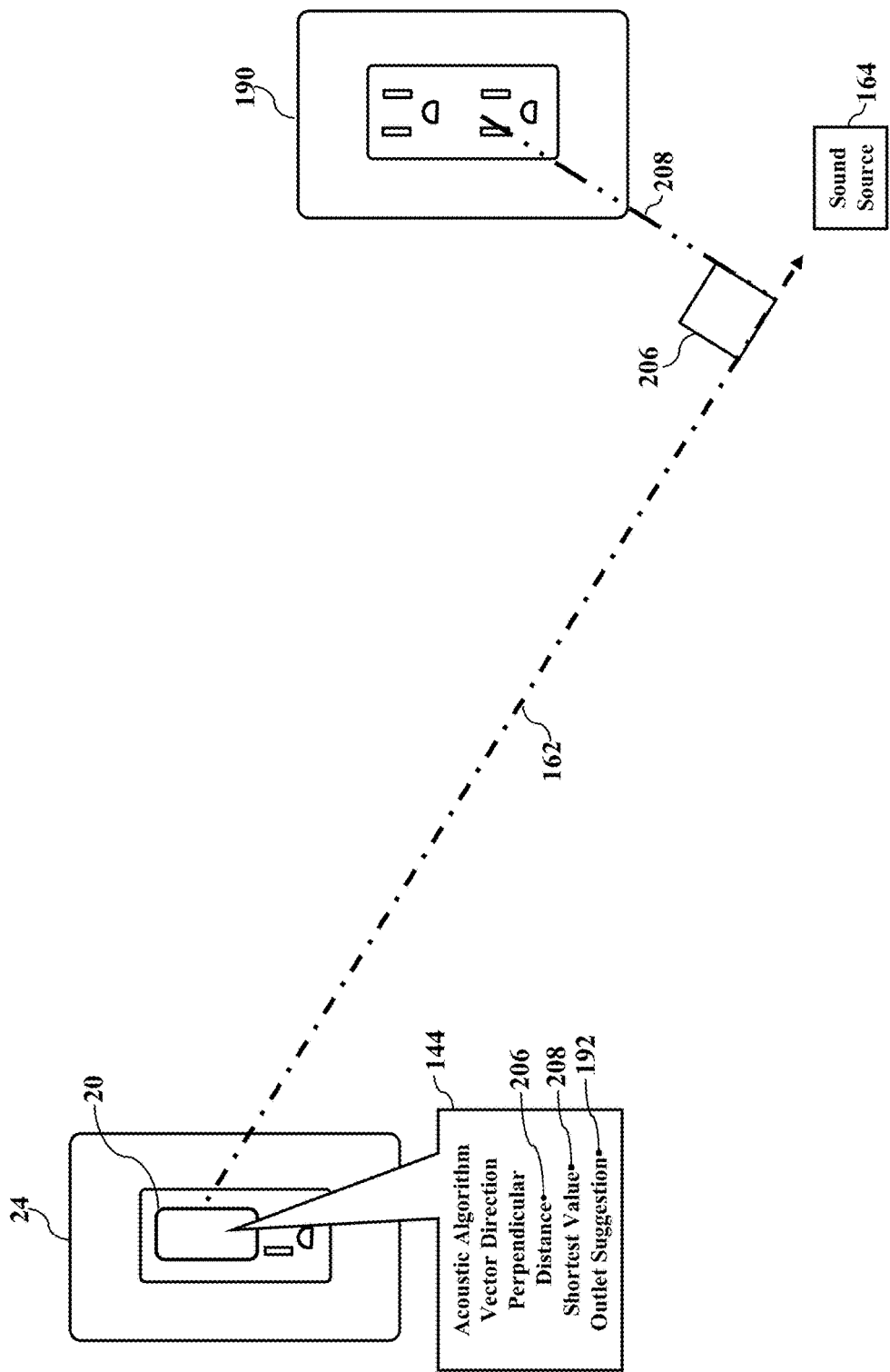

As FIG. 23 illustrates, exemplary embodiments may consult an electronic database 200 of electrical outlets. The vector direction 162 represents a linear line to the sound source 164, as oriented from the currently installed location 180 of the portable acoustical unit 20. Once the vector direction 162 is determined, the electronic database 200 of electrical outlets may be queried to determine an alternative electrical outlet having a closer installation location to the vector direction 162. FIG. 23, for example, illustrates the electronic database 200 of electrical outlets as being locally stored in the memory 146 of the portable acoustical unit 20, but the electronic database 200 of electrical outlets may have some or all entries stored at a different networked location (such as the controller 46). Regardless, the electronic database 200 of electrical outlets is illustrated a table 202 that maps, relates, or associates different electrical outlet identifiers ("Outlet ID") 204 to their corresponding installation location 180. The electronic database 200 of electrical outlets thus has electronic database associations between electrical outlet identifiers 204 and the global positioning system information 182 describing the installed locations 180 of different electrical outlets in the home or business. Each electrical outlet identifier 204 may be any alphanumeric combination that is uniquely assigned to a corresponding one of the electrical outlets. Once the vector direction 162 is determined, exemplary embodiments may query for and retrieve the global positioning system information 182 associated with one or more of the electrical outlets and compute a perpendicular distance 206 to the linear line representing vector direction 162. Exemplary embodiments may repeatedly calculate the perpendicular distance 206 for each electrical outlet 24 (e.g., each electrical outlet identifier 204) in the database 200 of electrical outlets. As FIG. 24 best illustrates, comparisons may be performed. Once one or more of the perpendicular distances 206 are determined, the acoustic algorithm 144 may compare any or all of the perpendicular distances 206 and select the shortest value 208 as the outlet suggestion 192. The shortest value 208 of the perpendicular distances 206 may thus be physically closer to the sound source 164. Exemplary embodiments, in plain words, have identified the different electrical outlet 190 that is closest to the linear line representing vector direction 162 to the sound source 164.

Figure 25:
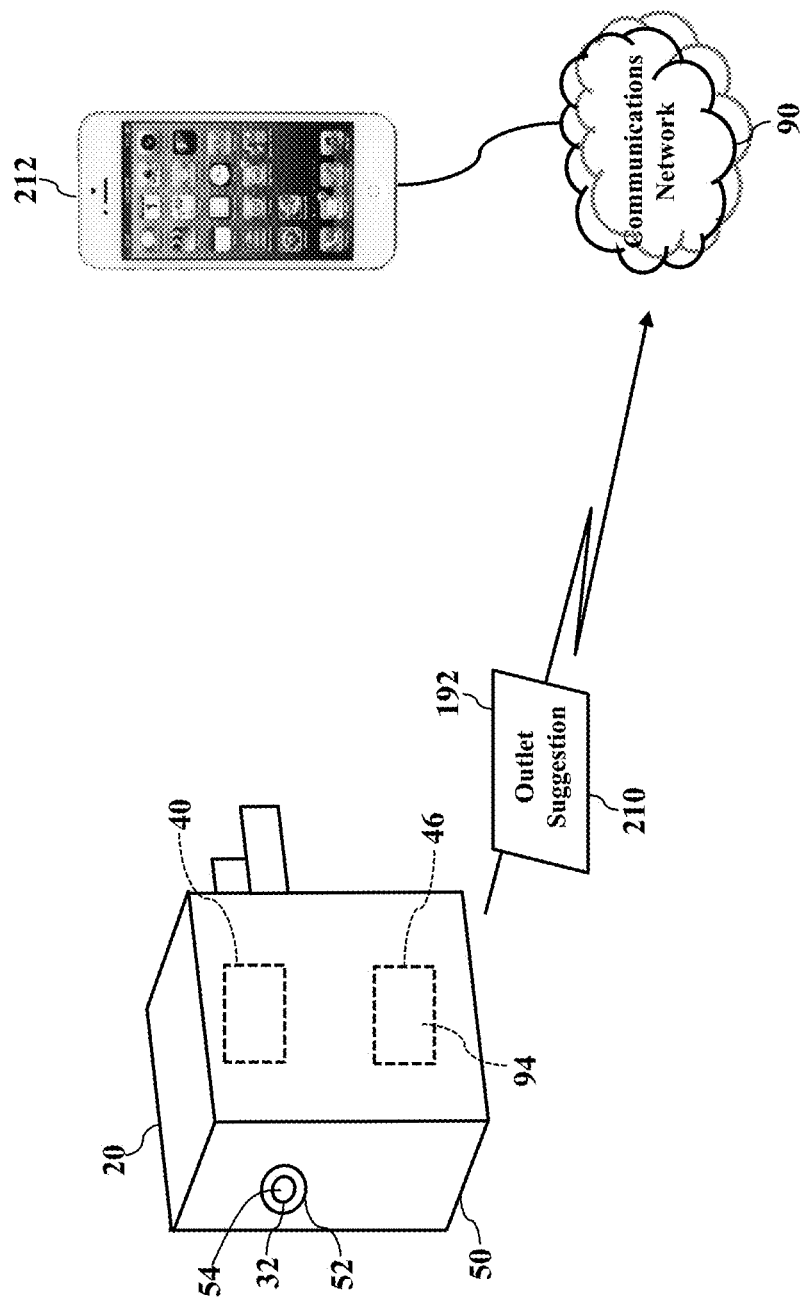

FIG. 25 further illustrates the outlet suggestion 192. Once the outlet suggestion 192 is determined, exemplary embodiments may convey the outlet suggestion 192 to the user. FIG. 25, for example, illustrates the outlet suggestion 192 packaged as an electronic message 210 that is sent into the communications network 90 for delivery to any destination address (such as the user's smartphone 212). The outlet suggestion 192 may thus be sent as a text or email message to identify the different electrical outlet 190 (perhaps by its electrical outlet identifier 204) that is physically closer to the vector direction 162 to the sound source 164. When the user's smartphone 212 receives the electronic message 210, the outlet suggestion 192 is processed for display. Exemplary embodiments may thus suggest that the user physically remove the portable audio unit 20 from the current electrical outlet 24 and, instead, move the portable audio unit 20 to the different electrical outlet 190.

Exemplary embodiments have learning abilities. As the portable acoustical unit 20 operates, in time the same vector direction 162 may be repeatedly determined. The sound source 164, in other words, nearly always generates or propagates from the same location. This repetition is understood when the reader realizes the typical furniture configuration of homes and businesses. Most people place their furniture in a room, and that placement remains constant. Indeed, a couch and chair may have the same arrangement for years. So, as people gather in the room and converse, the vector direction 162 will repeatedly coincide with the couch and chair where people sit. The portable acoustical unit 20 is thus likely to observe the same general vector direction 162 that matches the placement of furniture in the room. The portable acoustical unit 20 will similarly determine the same general vector direction 162 in a kitchen where people habitually stand to prepare meals. Over time, then, the portable acoustical unit 20 will learn and identify the electrical outlet 24 that is closest to the people in the room. The user may thus adopt the outlet suggestion 192 and move the portable acoustical unit 20 for best acoustic reception.

Figure 26:
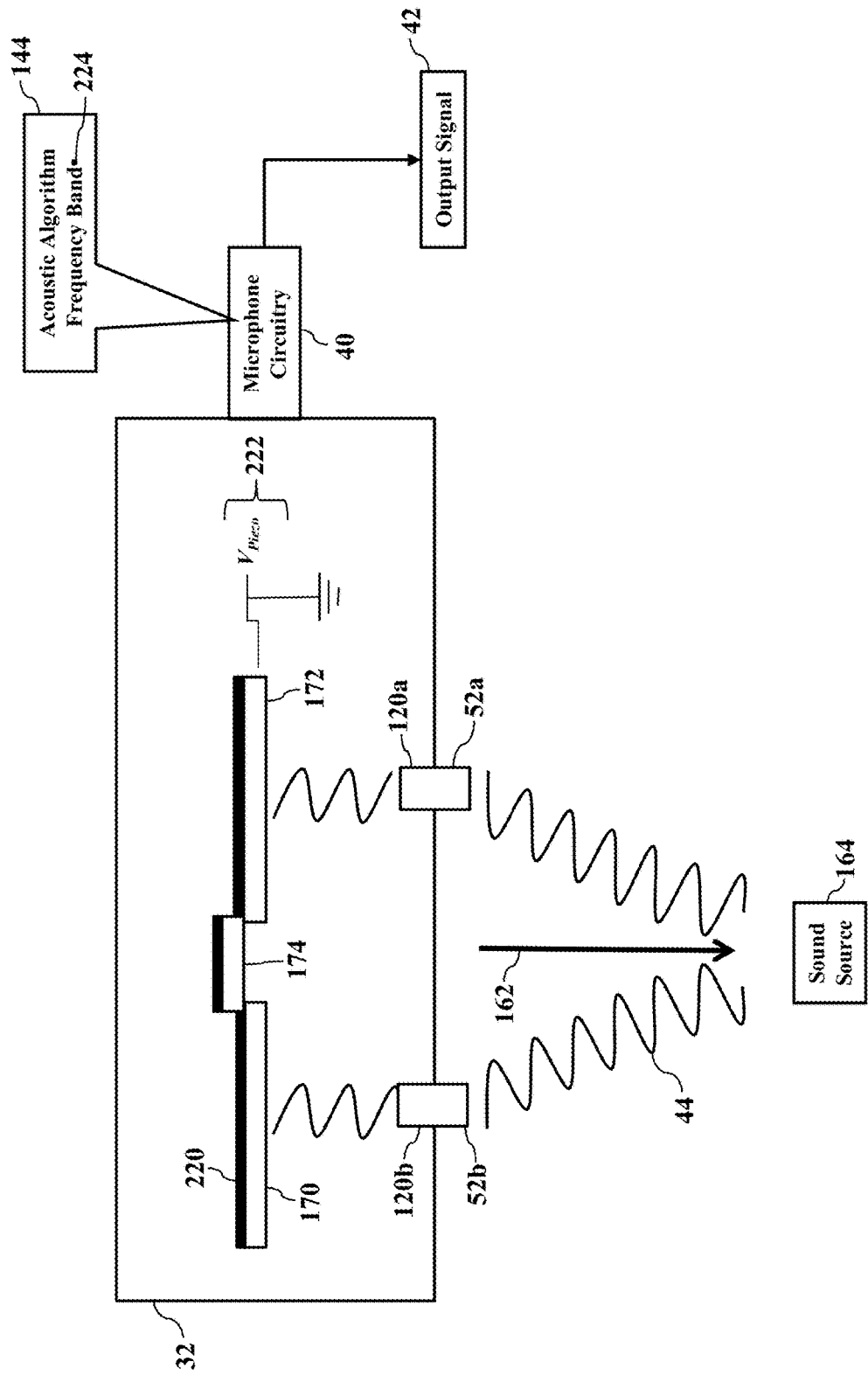
FIGS. 26-29 illustrate personalized tuning, according to exemplary embodiments.

FIGS. 26-29 illustrate personalized tuning, according to exemplary embodiments. Here piezoelectric components may be used to personalize the portable acoustical unit 20 to the frequency characteristics of the speaking user. As FIG. 26 illustrates, the microphone 32 may have a thin-film coating or deposition of piezoelectric material 220 on the membranes 170 and 172 and/or on the bridge 174. When an electrical voltage $V_{Piezo}$ (illustrated as reference numeral 222) is applied to the piezoelectric material 220, the piezoelectric material 220 changes its strain properties according to the piezoelectric effect. The change in the strain properties of the piezoelectric material 220 causes a change in the vibration of the membranes 170 and 172 and/or the bridge 174. The microphone 32, in other words, may change its frequency response characteristics, based on the electrical voltage $V_{Piezo}$ applied to the piezoelectric material 220. The microphone 32 may thus be forced, or tuned, to respond to different excitation acoustic frequencies by changing the electrical voltage $V_{Piezo}$ applied to the piezoelectric material 220. For example, increasing the electrical voltage $V_{Piezo}$ may increase the strain/stiffness the piezoelectric material 220, while decreasing the electrical voltage $V_{Piezo}$ reduces the strain/stiffness. The electrical voltage $V_{Piezo}$, in other words, may determine a frequency band 224 at which the microphone 32 detects. So, by changing the electrical voltage $V_{Piezo}$ applied to the piezoelectric material 220, the microphone 32 may detect different acoustic frequencies. The electrical voltage $V_{Piezo}$ may be supplied by or derived from by the electrical power 34 (such as produced by the microphone circuitry 40 illustrated in FIG. 20).

Figure 27:
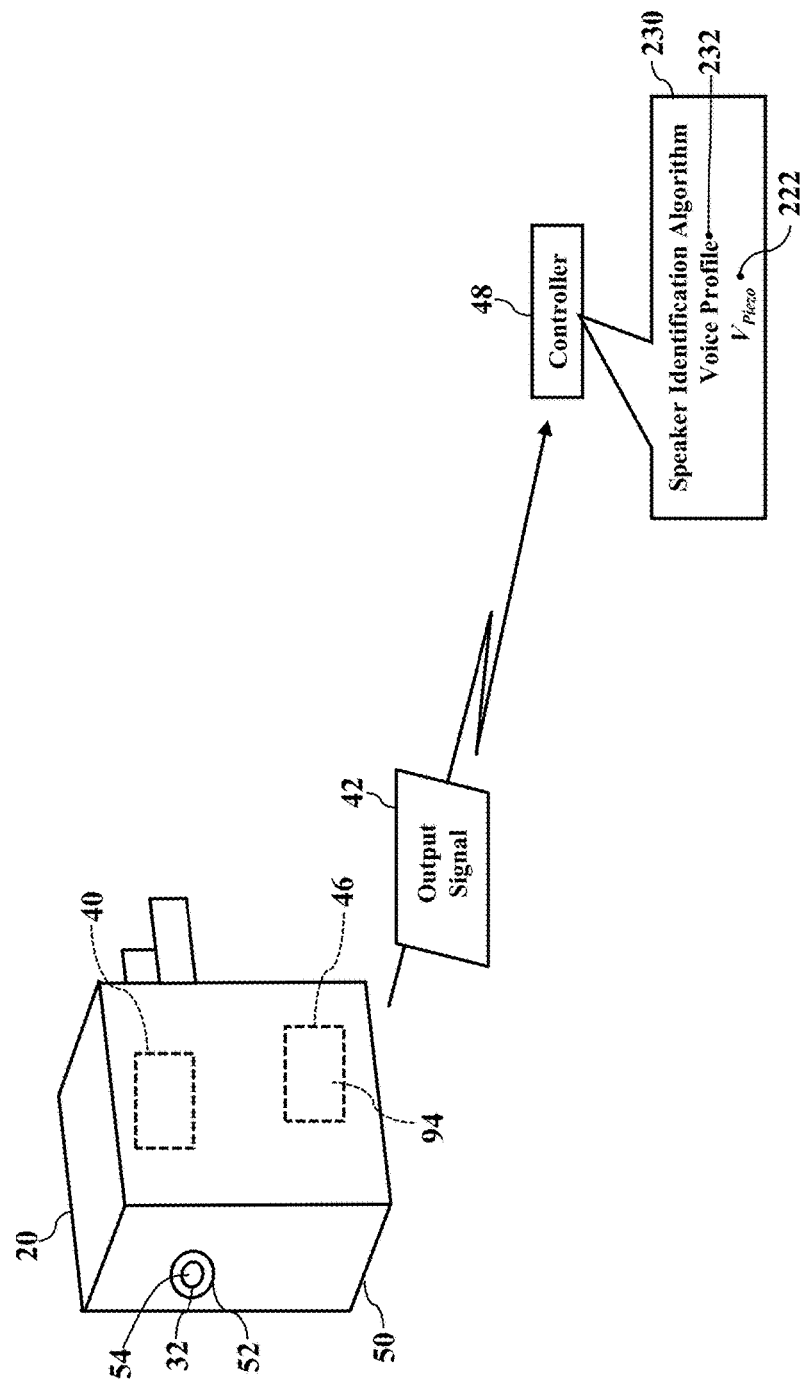

FIG. 27 illustrates the personalization. When the microphone 32 senses the stimulus sound pressure wave 44 (illustrated in FIG. 26), exemplary embodiments may identify the speaker/user. For example, the output signal 42 generated by the portable acoustical unit 20 may be sent to the controller 48 for analysis. The controller 48 may execute a speaker identification algorithm 230 that analyzes the output signal 42 to identify the speaking user. Speaker or voice recognition is known and need not be explained in detail for these purposes. Suffice it to say the speaker identification algorithm 230 identifies the speaking user from perhaps a group of possible known occupant voice profiles 232. Once the speaker is identified, the electrical voltage $V_{Piezo}$ (illustrated as reference numeral 222) may then be determined.

Figure 28:
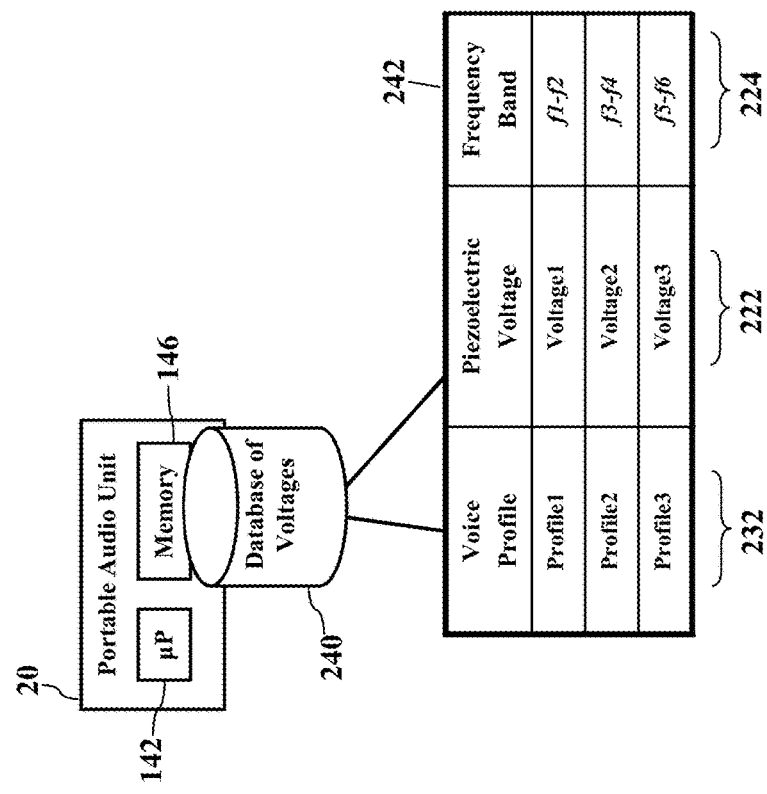

FIG. 28, for example, illustrates an electronic database 240 of voltages. The electronic database 240 of voltages is illustrated as being locally stored in the portable acoustical unit 20, but the database entries may be remotely accessed and queried from any network location. Once the speaker is identified (based on the speaker's voice profile 232), the electronic database 240 of voltages may be queried for the corresponding value of the electrical voltage $V_{Piezo}$. FIG. 28 illustrates the electronic database 240 of voltages as a table 242 that maps, relates, or associates different voice profiles 232 to their corresponding electrical piezoelectric voltages $V_{Piezo}$ (illustrated as reference numeral 222). The electronic database 240 of voltages thus has electronic database associations between different voice profiles and different electrical voltages $V_{Piezo}$. Once the speaker's voice profile 232 is identified, exemplary embodiments may query the electronic database 240 of voltages and retrieve the electrical voltage $V_{Piezo}$ that best tunes the portable acoustical unit 20 to the speaker's voice characteristics (such as the frequency band 224).

Figure 29:
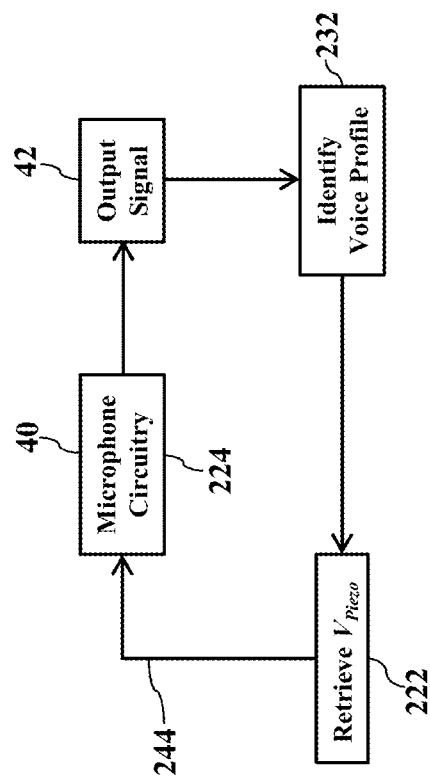

FIG. 29 thus illustrates a feedback loop 244. Now that the electrical voltage $V_{Piezo}$ is known, the electrical voltage $V_{Piezo}$ may thus be applied to the microphone 32 as feedback. The electrical voltage $V_{Piezo}$ (illustrated as reference numeral 222) thus fine tunes the frequency band 224 at which the microphone circuitry 40 is most sensitive to the speaker's voice. Exemplary embodiments, in other words, may alter the mechanical strain of the piezoelectric material 220 (illustrated in FIG. 26) to personalize the microphone's sensitivity to the speaker's voice. Indeed, exemplary embodiments may even be configured to only recognize one or a few voice profiles 232 by limiting the electrical voltage $V_{Piezo}$ and thus the microphone's sensitivity to certain speaker's voices.

Exemplary embodiments may be physically embodied on or in a computer-readable memory device or other storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for portable voice control, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A portable acoustical unit, comprising:
   an enclosure exposing a mechanical power plug adapted for physical connection to an electrical outlet;
   a microphone having a sensory element exposed through the enclosure;
   circuitry housed within the enclosure, the circuitry electrically connected to the mechanical power plug;
   a hardware processor housed within the enclosure; and
   a memory device housed within the enclosure, the memory device storing instructions that when executed causes the hardware processor to perform operations, the operations comprising:
   converting alternating current electrical power at the mechanical power plug into direct current electrical power;
   identifying a voice profile associated with a voice of a speaker, the voice profile based on an output generated by the microphone;
   querying an electronic database for the voice profile, the electronic database electronically associating voltages to voice profiles including the voice profile identified based on the output generated by the microphone speaker;
   identifying a voltage of the voltages in the electronic database that is electronically associated with the voice profile; and
   feedback tuning the microphone based on the voltage that is electronically associated with the voice profile.

2. The portable acoustical unit of claim 1, wherein the operations further comprise converting the voltage.

3. The portable acoustical unit of claim 1, wherein the operations further comprise applying the voltage to a component of the microphone as the feedback tuning.

4. The portable acoustical unit of claim 1, further comprising an acoustic aperture in the enclosure that exposes the sensory element of the microphone.

5. The portable acoustical unit of claim 1, further comprising a network interface to a communications network, the network interface housed within the enclosure.

6. The portable acoustical unit of claim 1, further comprising a wireless network interface to a wireless communications network, the wireless network interface housed within the enclosure.

7. The portable acoustical unit of claim 1, further comprising filter circuitry housed within the enclosure, wherein the filter circuitry filters signals representing inaudible frequencies.

8. A portable acoustical unit, comprising:
   an enclosure exposing a mechanical power plug having male blades adapted for physical connection to a female electrical outlet;

a microphone having a sensory element exposed through the enclosure;

circuitry housed within the enclosure and having an electrical connection to the mechanical power plug;

a processor housed within the enclosure; and a memory device housed within the enclosure, the memory device storing instructions that when executed causes the processor to perform operations, the operations comprising:

converting alternating current electrical power when applied to the mechanical power plug into direct current electrical power;

identifying a voice profile associated with a voice of a speaker, the voice profile based on an output generated by the microphone;

querying an electronic database for the voice profile, the electronic database electronically associating voltages to voice profiles including the voice profile associated with the voice of the speaker;

identifying a voltage of the voltages in the electronic database that is electronically associated with the voice profile; and feedback tuning the microphone to the voice of the speaker based on the voltage that is electronically associated with the voice profile.

9. The portable acoustical unit of claim 8, wherein the operations further comprise retrieving a value representing the voltage.

10. The portable acoustical unit of claim 8, wherein the operations further comprise applying the voltage to a component of the microphone as the feedback tuning.

11. The portable acoustical unit of claim 8, further comprising an acoustic aperture in the enclosure that exposes the sensory element of the microphone.

12. The portable acoustical unit of claim 8, further comprising a network interface to a communications network, the network interface housed within the enclosure.

13. The portable acoustical unit of claim 8, further comprising a wireless network interface to a wireless communications network, the wireless network interface housed within the enclosure.

14. The portable acoustical unit of claim 8, further comprising filter circuitry housed within the enclosure, wherein the filter circuitry filters signals representing inaudible frequencies.

15. A portable acoustical unit, comprising:

an enclosure exposing a mechanical power plug having a universal serial bus connector adapted for physical connection to an electrical outlet;

a microphone having a sensory element exposed through the enclosure;

circuitry housed within the enclosure and having an electrical connection to the mechanical power plug;

a processor housed within the enclosure; and a memory device housed within the enclosure, the memory device storing instructions that when executed causes the processor to perform operations, the operations comprising:

converting alternating current electrical power when applied to the mechanical power plug into direct current electrical power;

identifying a voice profile associated with a voice of a speaker, the voice profile based on an output generated by the microphone;

querying an electronic database for the voice profile, the electronic database electronically associating voltages to voice profiles including the voice profile associated with the voice of the speaker;

identifying a voltage of the voltages in the electronic database that is electronically associated with the voice profile; and feedback tuning the microphone to the voice of the speaker based on the voltage that is electronically associated with the voice profile.

16. The portable acoustical unit of claim 15, wherein the operations further comprise retrieving a value from the electronic database representing the voltage.

17. The portable acoustical unit of claim 15, wherein the operations further comprise applying the voltage to a component of the microphone as the feedback tuning.

18. The portable acoustical unit of claim 15, further comprising an acoustic aperture in the enclosure that exposes the sensory element of the microphone.

19. The portable acoustical unit of claim 15, further comprising a network interface to a communications network, the network interface housed within the enclosure.

20. The portable acoustical unit of claim 15, further comprising a wireless network interface to a wireless communications network, the wireless network interface housed within the enclosure.

\* \* \* \* \*